United States Patent [19]
Yamamoto

[11] Patent Number: 5,737,206
[45] Date of Patent: Apr. 7, 1998

[54] CONTROL SYSTEM FOR POWER CONVERSION SYSTEM

[75] Inventor: Hajime Yamamoto, Tokyo, Japan

[73] Assignee: Kabushiki Kaisha Toshiba, Kawasaki, Japan

[21] Appl. No.: 771,841

[22] Filed: Dec. 23, 1996

[30] Foreign Application Priority Data

Dec. 25, 1995 [JP] Japan .................. 7-336252

[51] Int. Cl.$^6$ .................................................. H02M 7/48
[52] U.S. Cl. .................... 363/96; 363/71; 363/95
[58] Field of Search ..................... 363/65, 71, 95, 363/96, 67; 307/55, 58, 82

[56] References Cited

U.S. PATENT DOCUMENTS

| | | | |
|---|---|---|---|
| 3,876,923 | 4/1975 | Humphrey et al. | 363/71 |
| 4,663,702 | 5/1987 | Tanaka | 363/65 |
| 4,677,535 | 6/1987 | Kawabata et al. | 363/65 |
| 4,800,478 | 1/1989 | Takahashi | 363/41 |
| 5,212,630 | 5/1993 | Yamamoto et al. | 363/71 |
| 5,257,180 | 10/1993 | Sashida et al. | 363/71 |
| 5,446,645 | 8/1995 | Shirahama et al. | 363/71 |
| 5,623,192 | 4/1997 | Yamamoto | 318/811 |

FOREIGN PATENT DOCUMENTS 7-135776  5/1995  Japan.
8-33351   2/1996  Japan.

Primary Examiner—Adolf Berhane
Attorney, Agent, or Firm—Oblon, Spivak, McClelland, Maier & Neustadt, P.C.

[57] ABSTRACT

A control system for a power conversion system composed of a plurality of unit converters and a transformer for connecting AC outputs of the converters in series. The control system includes a unit for detecting an AC system voltage at the primary winding of the transformer, a unit for generating a command voltage vector of a voltage output from the power conversion system at the primary winding of the transformer based on the AC system voltage, and a unit for generating a plurality of actual voltage vectors of voltages output from the power conversion system at the primary winding of the transformer. The control system further includes a unit for selecting one of the actual voltage vectors that is the closest to the command voltage vector to generate as a selected actual voltage vector, and a unit for calculating a plurality of voltage vectors based on the selected actual voltage vector and for generating a plurality of ON-OFF commands for the self-turn-off devices, each determined by one of the voltage vectors, respectively, whereby to control the power conversion system so as to generate the selected actual voltage vector that is the closest to the command voltage vector at the primary winding of the transformer.

12 Claims, 17 Drawing Sheets

CONTROL SYSTEM FOR POWER CONVERSION SYSTEM

BACKGROUND OF THE INVENTION

1. Field of the Invention

This invention relates to a control system for a power conversion system, and more particularly to a control system for a power conversion system used in, for example a DC transmission system, which operates while connecting AC outputs of a plurality of unit converters in series by a transformer.

2. Description of the Related Art

FIG. 19 is a block diagram showing the construction of the main circuit of a conventional power conversion system to which the present invention is applicable. In this figure, a primary winding 1P of a transformer 1 is connected to the AC power system, 2A–2D are secondary windings of transformer 1 connected to primary winding 1P of transformer 1, 3A–3D are converters each of which is composed of gate turn-off thyristors (hereinafter, simply shown as GTO) and diodes, and 4 is a DC power source. Further, 5–10 are GTOs of converter 3A.

FIG. 20 is a block diagram of a conventional control system to control the power conversion system shown in FIG. 19. In FIG. 20, items assigned with the same reference numerals shown in FIG. 19 are provided with the same functions and therefore, the explanation thereof will be omitted here.

In FIG. 20, 11 is a power source system, 12 is a voltage detector to detect line-to-line voltages of power source system 11, 13 is a line-to-line voltage to phase voltage conversion circuit, 14 is a three-phase to two-phase conversion circuit to which the output of line-to-line voltage to phase voltage conversion circuit 13 is applied, and 15 is a current control circuit to control output currents of converters 3A–3D. 16 is an adder to add up the output of the three-phase to two-phase conversion circuit 14 and the output of the current control circuit 15. 17 is a two-phase to three-phase conversion circuit. 18 is a phase angle computing circuit to convert two-phase AC signal of the output from adder 16 into a phase angle. 19 is a triangular wave generating circuit to generate triangular waves corresponding to phase angles 0° to 360°. 20 is a cross point detecting circuit to receive the output of two-phase to three-phase conversion circuit 17 and the output of triangular wave generating circuit 19 and generates a signal to turn ON/OFF the GTOs of converters 3A–3D by detecting a cross point of a triangular wave with each of three-phase voltage commands outputted from two-phase to three-phase conversion circuit. 70 is a gate pulse generating circuit to generate gate pulses to turn the GTOs of converters 3A–3D ON/OFF based on the signal outputted from cross point detecting circuit 20.

FIGS. 21 and 22 are waveform diagrams for explaining the actions when the power conversion system shown in FIG. 19 is controlled by the conventional control system shown in FIG. 20.

Hereinafter, the actions will be explained referring to FIGS. 19, 20, 21 and 22.

VLUV, VLVW and VLWU shown in FIG. 21 are UV-phase, VW-phase and WU-phase line-to-line voltages detected at primary winding 1P of transformer 1 by voltage detector 12, respectively. Line-to-line voltage to phase voltage conversion circuit 13 performs the calculation of following formulas and converts line-to-line voltages VLUV, VLVW and VLWU into U, V and W phase voltages VLU, VLV and LVW, respectively.

In FIG. 21, in each of waveforms, the horizontal axis shows the time measured by second. The vertical axis in each of waveforms, except that of phase angle signal TH, shows the voltage measured by power unit (PU). The vertical axis in the waveform (TH) shows the angle measured by radian.

In FIG. 22, in each of waveforms, the horizontal axis shows the time, and the vertical axis shows the current or the voltage. In this figure, RIQ and RID are an active current command and a reactive current command generated by current control circuit 15. IQ and ID are an active current and a reactive current flowing through primary winding 1P of transformer 1. IU, IV and IW are U, V and W-phase currents flowing through primary winding 1P of transformer 1.

$$VLU = (2 \times VLUV + VLVW)/3$$

$$VLV = (2 \times VLVW + VLWU)/3$$

$$VLW = (2 \times VLWU + VLUV)/3$$

Three-phase to two-phase conversion circuit 14 converts phase voltages VLU, VLV and LVW into two-phase signals VLA and VLB in an orthogonal AB coordinate system. Here, it is assumed that an axis A is taken in the direction of U-phase and an axis B is advanced from axis A by 90°.

$$VLA = VLU - (VLV + VLW)/2$$

$$VLB = (VLV - VLW) \times \sqrt{3}/2$$

The outputs VLA and VLB of three-phase to two-phase conversion circuit 14 and the outputs of current control circuit 15 are added up by adder 16. In order to make the explanation easy to understand, hereinafter the outputs of current control circuit 15 are assumed to be zero. That is, the state will be explained that converters 3A–3D generate voltages equal to the voltage generated from power source system 11 and the output current is zero. Accordingly, outputs VA and VB of adder 16 are equal to outputs of VLA and VLB of three-phase to two-phase conversion circuit 14. Phase angle computing circuit 18 carries out the calculation of the following formulas and calculates a phase angle signal TH from output signals VA and VB.

When VA is positive and is larger than (an absolute value of VB):

$$TH = \tan^{-1}(VB/VA)$$

When VB is positive and is larger than (an absolute value of VA):

$$TH = -\tan^{-1}(VA/VB) + 90°$$

When VA is negative and is smaller than −(an absolute value of VB):

$$TH = \tan^{-1}(VB/VA) + 180°$$

When VB is negative and is smaller than −(an absolute value of VA):

$$TH = -\tan^{-1}(VB/VA) + 270°$$

The waveform of phase angle signal TH is shown in FIG. 21, which is measured by radian.

Two-phase to three-phase conversion circuit 17 converts two-phase signals VA and VB generated from adder 16 into three-phase signals VUR, VVR and VWR as shown in the following formulas.

$$VUR = 2/3 \times VA$$
$$VVR = -1/3 \times VA + 1/\sqrt{3} \times VB$$
$$VWR = -1/3 \times VA - 1/\sqrt{3} \times VB$$

Here, signals VUR, VVR and VWR are respectively used as U-phase, V-phase and W-phase voltage commands for converters 3A–3D commonly.

Triangular wave generating circuit 19 calculates the following formula and converts phase angle signal TH into a triangular wave signal TRIUA, which is a triangular wave signal to control U-phase GTOs of converter 3A.

$$THO=(TH-90°)\times 9$$

When THO is larger than 360°×n (n is 0 or an integer larger than 0) and is smaller than 360°×n+180°:

$$TRIUA=-1+(THO-n\times 360°)/90°$$

When THO is larger than 360×n (n is 0 or an integer larger than 0)+180 and is smaller than 360°×n+360°:

$$TRIUA=3-THO/90°$$

The waveform of triangular wave signal TRIUA is shown in FIG. 21. At the same time, triangular wave generating circuit 19 generates triangular wave signals TRIUB, TRIUC and TRIUD by performing the similar calculation of the following formulas:

$$THO=(TH-90°)\times 9°-15° \text{ (for converter 3B)}$$
$$THO=(TH-90°)\times 9°-30° \text{ (for converter 3C)}$$
$$THO=(TH-90°)\times 9°-45° \text{ (for converter 3D)}$$

TRIUB, TRIUC and TRIUD are triangular wave signals, although not shown, to control U-phase GTOs of the converters 3B, 3C and 3D, respectively. At the same time, triangular wave signal generating circuit 19 generates triangular wave signals TRIVA, TRIVB, TRIVC and TRIVD by performing the similar calculation of the following formulas:

$$THO=(TH-90°-120°)\times 9 \text{ (for converter 3A)}$$
$$THO=(TH-90°-120°)\times 9°-15° \text{ (for converter 3B)}$$
$$THO=(TH-90°-120°)\times 9°-30° \text{ (for converter 3C)}$$
$$THO=(TH-90°-120°)\times 9°-45° \text{ (for converter 3D)}$$

TRIVA, TRIVB, TRIVC and TRIVD are triangular wave signals, although not shown, to control V-phase GTOs of converters 3A, 3B, 3C and 3D, respectively. At the same time, triangular wave generating circuit 19 generates triangular wave signals TRIWA, TRIWB, TRIWC and TRIWD by performing the similar calculation of the following formulas:

$$THO=(TH-90°-240°)\times 9 \text{ (for converter 3A)}$$
$$THO=(TH-90°-240°)\times 9°-15° \text{ (for converter 3B)}$$
$$THO=(TH-90°-240°)\times 9°-30° \text{ (for converter 3C)}$$
$$THO=(TH-90°-240°)\times 9°-45° \text{ (for converter 3D)}$$

TRIWA, TRIWB, TRIWC and TRIWD are triangular wave signals, although not shown, to control W-phase GTOs of converters 3A, 3B, 3C and 3D, respectively.

In FIG. 21, VUR is a U-phase voltage command generated from two-phase to three-phase conversion circuit 17.

U-phase voltage command VUR and triangular wave signal TRIUA are compared by cross point detecting circuit 20 and GTO 5 is turned ON if VUR is larger than TRIUA, while GTO 8 is turned ON if VUR is smaller than TRIUA. Similarly, ON/OFF of GTO 6 and GTO 9 is decided by comparing V-phase voltage command VVR with triangular wave signal TRIVA and ON/OFF of GTO 7 and GTO 10 is decided by comparing W-phase voltage command VWR with triangular wave signal TRIWA.

As a result, a UV line-to-line voltage VUVA of converter 3A is obtained as shown in FIG. 21. As for converters 3B, 3C and 3D, the same ON/OFF controls as described above with respect to converter 3A are performed. As a result, UV line-to-line voltages VUVB, VUVC and VUVD of converters 3B, 3C and 3D are respectively obtained as shown in FIG. 21.

Voltages VUVA, VUVB, VUVC and VUVD are applied to UV-phases of secondary windings 2A, 2B, 2C and 2D of transformer 1, respectively. And a sine wave voltage VU (not shown) is generated in U-phase of primary winding 1P of transformer 1. Similarly, a sine wave voltage VV (not shown) which is behind to voltage VU by 120° in phase is generated in V-phase of primary winding 1P of transformer 1, and a voltage VUV is generated in the U-phase and V-phase lines. Voltage VUV becomes voltage of which fundamental wave is equal to system UV-phase line-to-line voltage VLUV. In FIG. 22, FUVA, FUVB, FUVC and FUVD are integrated value of voltages VUVA, VUVB, VUVC and VUVD, respectively and are quantities equivalent to UV-phase magnetic fluxes of secondary windings 2A, 2B, 2C and 2D of transformer 1.

FIG. 22 shows operating waveforms when one line of W-phase is grounded at a time t1 in the same construction as shown in FIG. 20. Even in the state where system voltage is distorted and becomes asymmetrical as shown here, the UV-phase line-to-line voltage VUV generated by the converters 3A–3D become the waveform satisfactorily following system UV-phase line-to-line voltage VLUV. Accordingly, overcurrent resulting from a difference between system voltage and converter voltage will not be generated. However, it can be seen that quantities FUVA, FUVB, FUVC and FUVD diverge. Especially, quantities FUVC and FUVD diverge heavily in the positive and negative directions, respectively. This is because voltages VUVA, VUVB, VUVC and VUVD generated from respective converters 3A, 3B, 3C and 3D contain DC components. Therefore, it is not possible to continue the operation of converters 3A, 3B, 3C and 3D as transformer 1 is saturated by this DC components.

Above description has been made with respect to UV-phase of the power conversion system. As for VW-phase and WU-phase, the power conversion system operates the same as in the UV-phase, so that the description thereof is omitted so as to make the description to be concise.

As described above, when the power conversion system is operated by connecting AC output voltages of converters 3A, 3B, 3C and 3D in series by transformer 1, if system voltage waveform is distorted by line-to-ground fault, etc., DC components are generated in voltages applied to transformer 1. As a result, it becomes impossible to continue the operation of power conversion system as transformer 1 is saturated by the DC components. Further, the self-turn-off devices of converters 3A, 3B, 3C and 3D repeat 9 times of ON/OFF per period, respectively. As a result, loss resulting from the switching become large and the converter efficiency drops.

SUMMARY OF THE INVENTION

Accordingly, one object of this invention is to provide a control system for a power conversion system operated by connecting AC outputs of a plurality of unit converters in series by a transformer which can suppress the number of switchings of self-turn-off devices in the unit converters, can reduce the loss resulting from the switchings and can increase the converter efficiency by controlling the unit converters so that the voltages generated on the primary winding of the transformer become a sine wave.

Another object of this invention is to provide a control system for a power conversion system operated by connecting AC outputs of a plurality of unit converters in series by a transformer which can control the unit converters such that no DC components are generated in the voltages applied to the transformer and the transformer is not saturated by the DC components, and thereby can continue the operation of the power conversion system even in the case of a system failure.

These and other objects of this invention can be achieved by providing a control system for a power conversion system composed of a plurality of unit converters and a transformer for connecting AC outputs of the unit converters in series, each of the unit converters composed of a plurality of bridge connected self-turn-off devices for converting DC power into AC power, each of AC sides of the unit converters connected to one of secondary windings of the transformer, respectively, DC sides of the unit converters connected in parallel to each other, respectively, and a primary winding of the transformer adapted for connecting to an AC power system. The control system includes, a unit for detecting an AC system voltage at the primary winding of the transformer, a unit for generating a command voltage vector of a voltage output from the power conversion system at the primary winding of the transformer based on the AC system voltage, a unit for generating a plurality of actual voltage vectors of voltages output from the power conversion system at the primary winding of the transformer, a unit for selecting one of the actual voltage vectors that is the closest to the command voltage vector to generate as a selected actual voltage vector, a unit for calculating a plurality of voltage vectors based on the selected actual voltage vector, each of the voltage vectors allocated to one of the unit converters, respectively, and output from one of the unit converters, respectively, and for generating a plurality of ON-OFF commands for the self-turn-off devices, each determined by one of the voltage vectors, respectively, and a unit for generating gate pulses to the self-turn-off devices of the unit converters based on the ON-OFF commands, whereby to control the power conversion system so as to generate the selected actual voltage vector that is the closest to the command voltage vector at the primary winding of the transformer.

According to one aspect of this invention, there is provided a control system for a power conversion system composed of a plurality of unit converters and a transformer for connecting AC outputs of the unit converters in series, each of the unit converters composed of a plurality of bridge connected self-turn-off devices for converting DC power into AC power, each of AC sides of the unit converters connected to one of secondary windings of the transformer, respectively, DC sides of the unit converters connected in parallel to each other, respectively, and a primary winding of the transformer adapted for connecting to an AC power system. The control system includes, a unit for detecting an AC system voltage at the primary winding of the transformer, a unit for generating a command voltage vector of a voltage output from the power conversion system at the primary winding of the transformer based on the AC system voltage, a unit for generating a plurality of actual voltage vectors of voltages output from the power conversion system at the primary winding of the transformer, a unit for selecting one of the actual voltage vectors that is the closest to the command voltage vector to generate as a selected actual voltage vector, a unit for detecting quantities equivalent to magnetic fluxes interlinking to the secondary windings of the transformer, a unit for calculating a plurality of voltage vectors based on the selected actual voltage vector and the quantities equivalent to the magnetic fluxes, each of the voltage vectors allocated to one of the unit converters, respectively, and output from one of the unit converters, respectively, and for generating a plurality of ON-OFF commands for the self-turn-off devices, each determined by one of the voltage vectors, respectively, and a unit for generating gate pulses to the self-turn-off devices of the unit converters based on the ON-OFF commands, whereby to control the power conversion system so as to generate the selected actual voltage vector that is the closest to the command voltage vector at the primary winding of the transformer.

According to the invention claimed in claim 1, as an actual voltage vector corresponding to the sum of output voltages of a plurality of unit converters is controlled to follow a command voltage vector representing a system voltage that changes in the form of sine wave, it is possible to control the output voltages of the unit converters to the form of sine wave. Further, as the selected actual voltage vector does not change unless the command voltage vector changes and the distance to another actual voltage vector becomes smaller than the distance to the present selected actual voltage vector, the number of switchings of the self-turn-off switching devices are suppressed to low.

According to the invention claimed in claim 2, as an actual voltage vector corresponding to the sum of output voltages of a plurality of unit converters is controlled to follow a command voltage vector representing a system voltage that changes in the form of sine wave, it is possible to control the output voltages of the unit converters in the form of sine wave. Further, as the selected actual voltage vector does not change unless the command voltage vector changes and the distance to another actual voltage vector becomes smaller than the distance to the present selected actual voltage vector, the number of switchings of the self-turn-off switching devices is suppressed to low. It is also possible to discriminate the magnitude of the quantities equivalent to magnetic fluxes interlinking to the secondary windings of the transformer and control the positive side voltage time product and the negative side voltage time product of line-to-line output voltages of the converters based on the discrimination result so that they will become almost equal to each other. As a result, it is possible to control the power conversion system such that no DC components are generated in the windings of the transformer.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
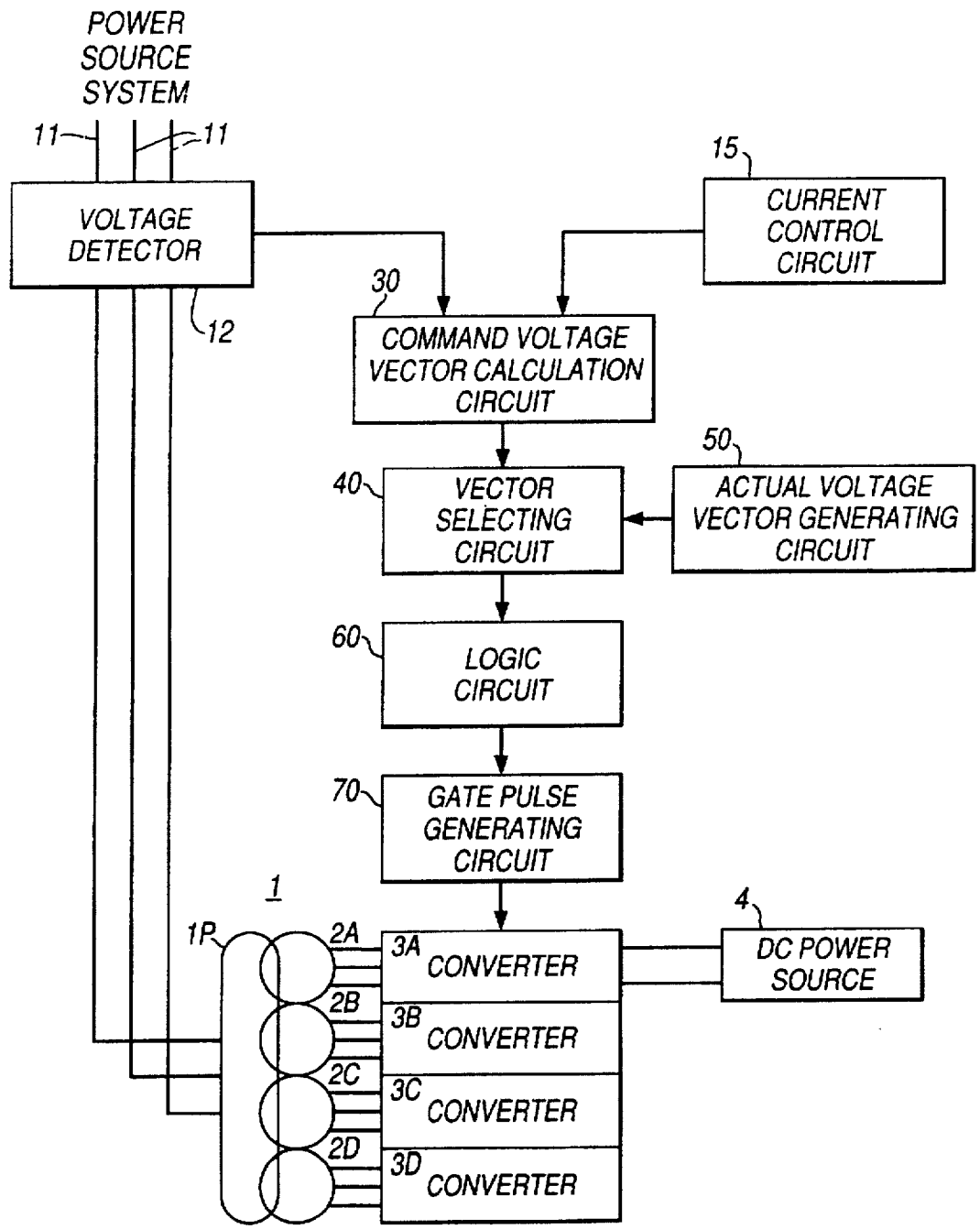
FIG. 1 is a block diagram showing a control system for a power conversion system according to a first embodiment of this invention.

Referring now to the drawings, wherein like reference numerals designate identical or corresponding parts throughout the several views, the embodiments of this invention will be described below.

FIG. 1 is a block diagram of a control system for a power conversion system according to a first embodiment of the present invention.

In FIG. 1, 1, 1P, 2A–2D, 3A–3D, 4, 11 and 12 are already described in the explanation of the conventional control system, and therefore, the description thereof will be omitted here.

15 is current control circuit to control output currents of converters 3A–3D. System voltages detected by voltage detector 12 and the output of current control circuit 15 are sent to a command voltage vector calculation circuit 30, which outputs a command voltage vector that is to be output by power converters 3A–3D. On the other hand, an actual voltage vector generating circuit 50 generates actual voltage vectors that can be output by the power conversion system. A vector selecting circuit 40 selects a voltage vector that is most close to a command voltage vector among actual voltage vectors, and outputs it as a selected actual voltage vector. A logic circuit 60 receives the selected actual voltage vector and the detailed description thereof will be given later.

Figure 2:
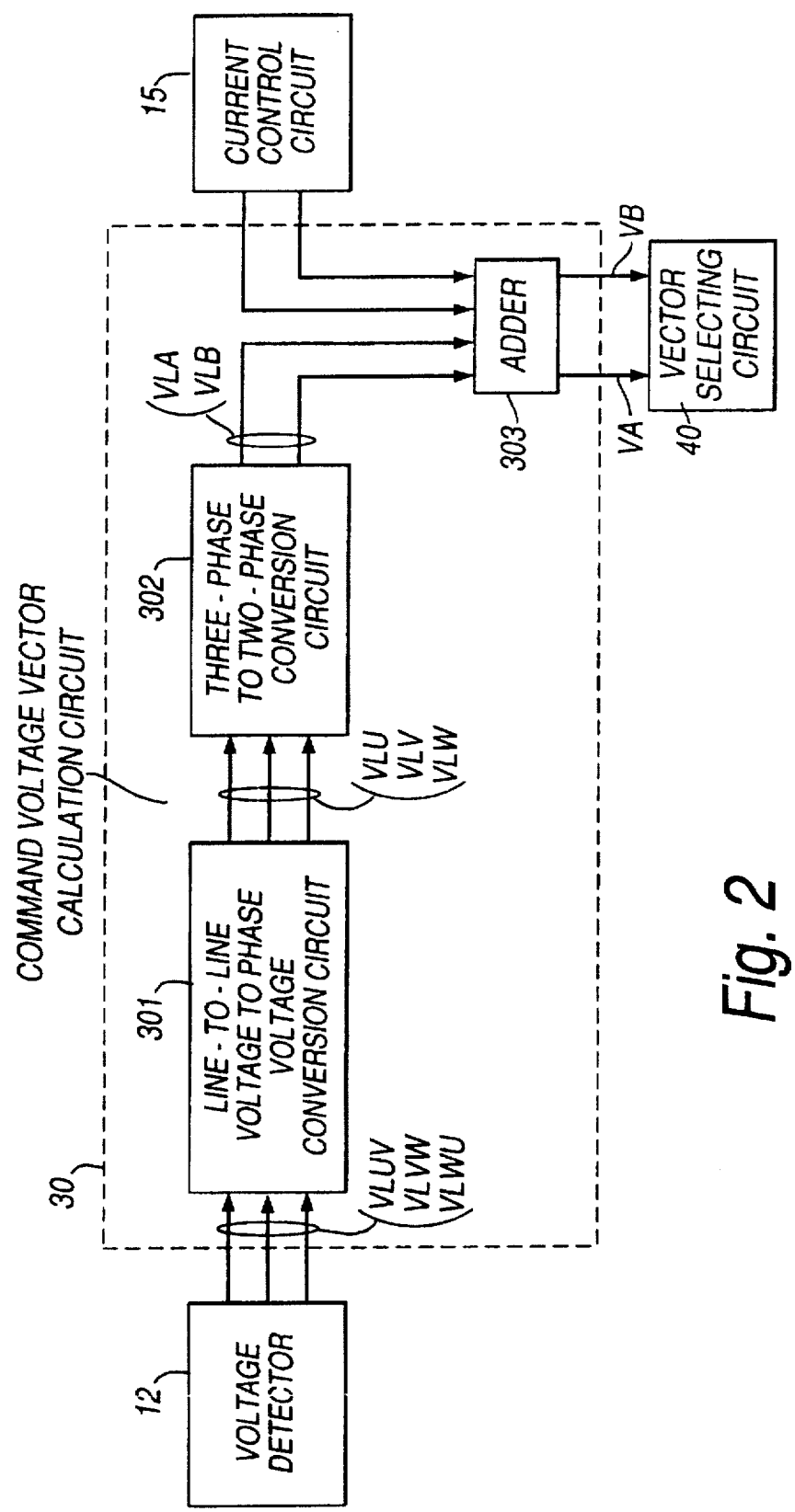
FIG. 2 is a block diagram showing a detailed construction of a command voltage vector calculation circuit 30 in the first embodiment shown in FIG. 1.

Gate pulse generating circuit 70 generates gate pulses to turn GTOs of power converters 3a–3D ON/OFF, based on the output of logic circuit 60. Further, using FIG. 1 and FIGS. 2 through 7, the construction of the control system shown in FIG. 1 will be explained. FIG. 2 is a diagram for explaining the construction of command voltage vector calculation circuit 30 shown in FIG. 1. UV, VW and WU line-to-line voltages VLUV, VLVW and VLWU of power source system 11 detected by voltage detector 12 are converted into U, V and W-phase voltages VLU, VLV and VLW in a line-to-line voltage to phase voltage conversion circuit 301 according to the following formulas:

$$VLU = (2 \times VLUV + VLVW)/3$$

$$VLV = (2 \times VLVW + VLWU)/3$$

$$VLW = (2 \times VLWU + VLUV)/3$$

Further, phase voltages VLU, VLV and VLW are converted into two-phase signals VLA and VLB in an orthogonal AB coordinate system in a three-phase to two-phase conversion circuit 302 according to the following formulas. Here, it is assumed that an axis A is taken in the direction of U-phase and an axis B is advanced from axis A by 90°.

$$VLA = VLU - (VLV + VLW)/2$$

$$VLB = (VLV - VLW) \times \sqrt{3}/2$$

Figure 3:
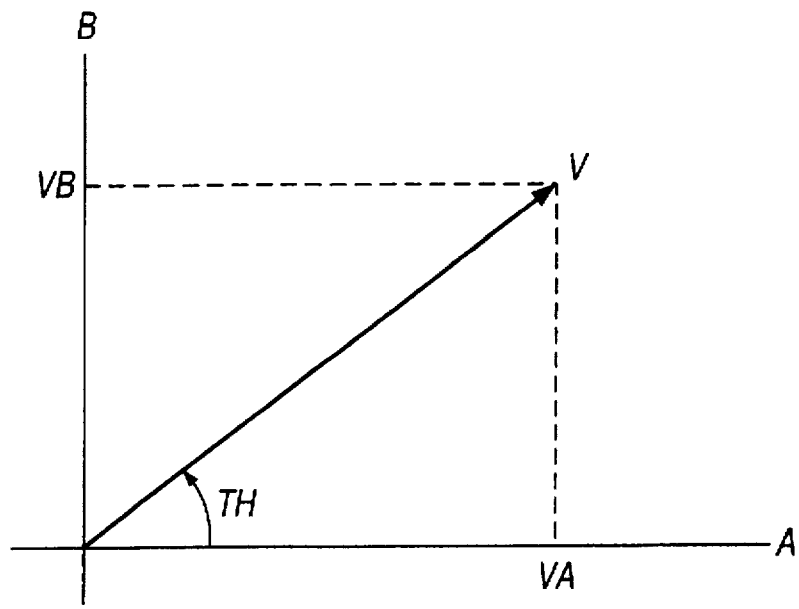
FIG. 3 is a diagram showing the relationship between a command voltage vector and a two-phase voltage command.

The outputs VLA, VLB of three-phase to two-phase conversion circuit 302 and the outputs of current control circuit 15 are added up by an adder 303. Hereinafter, to make the explanation easy to understand, the outputs of current control circuit 15 are assumed to be zero. That is, the state will be explained where converters 3A–3D generate voltages equal to the voltages generated from power source system 11 and the output current is zero. Accordingly, outputs VA and VB of adder 303 are equal to outputs VLA and VLB. As a result, a command voltage vector V shown in FIG. 3 are decided. Here, A-axis and B-axis components of command voltage vector V are VA and VB, respectively, and a phase angle thereof is TH.

Figure 4:
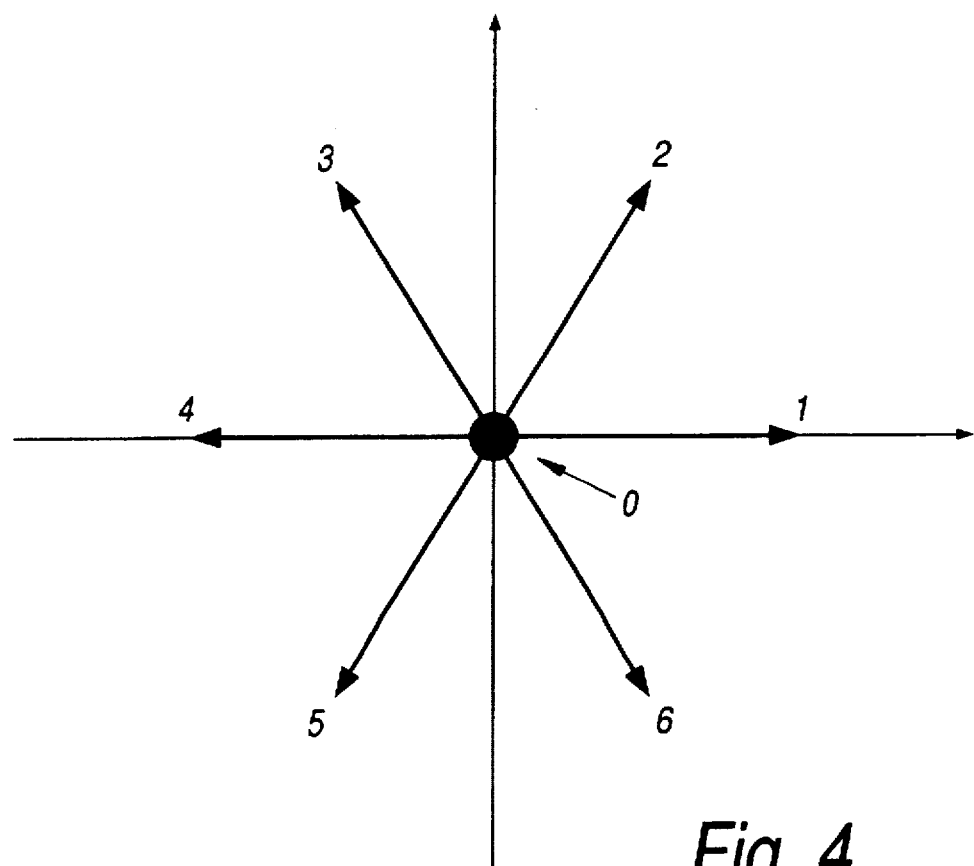
FIG. 4 is a diagram showing voltage vectors that can be generated by a unit converter.

FIG. 4 shows seven voltage vectors that can be generated by one unit converter, which can be expressed by seven kinds of Vectors 0–6. The relationship between these Vectors 0–6 and the switching status of corresponding GTOs 5–10 is shown in Table below.

TABLE

|  | GTO 5 | GTO 6 | GTO 7 | GTO 8 | GTO 9 | GTO 10 |
|---|---|---|---|---|---|---|
| Vector 0 | OFF | OFF | OFF | ON | ON | ON |
| Vector 1 | ON | OFF | OFF | OFF | ON | ON |
| Vector 2 | ON | ON | OFF | OFF | OFF | ON |
| Vector 3 | OFF | ON | OFF | ON | OFF | ON |
| Vector 4 | OFF | ON | ON | ON | OFF | OFF |
| Vector 5 | OFF | OFF | ON | ON | ON | OFF |
| Vector 6 | ON | OFF | ON | OFF | ON | OFF |

Figure 5:
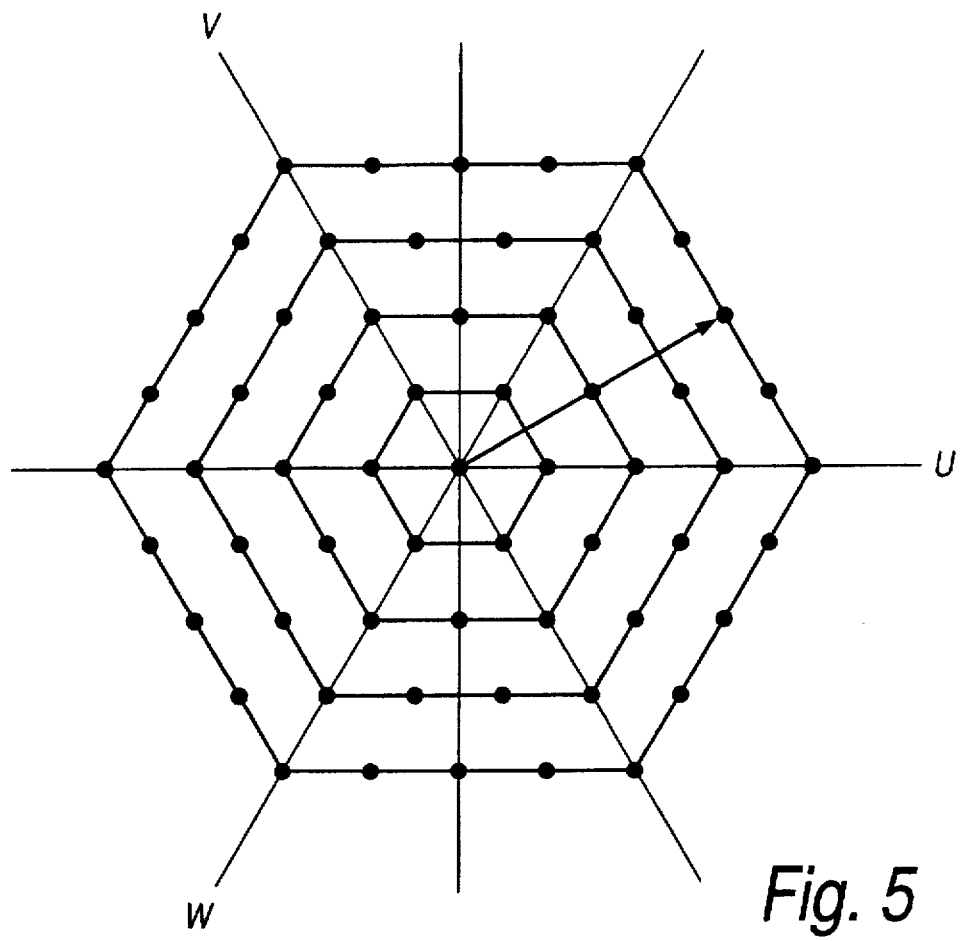
FIG. 5 is a diagram showing composite voltage vectors that can be generated by unit converters 3A–3D.

FIG. 5 is a diagram showing actual voltage vectors corresponding to voltages that can be generated by converters 3A–3D at the primary side of transformer 1. In FIG. 5, vectors connecting the origin and respective black circles represent actual voltage vectors, and 61 kinds of actual voltage vectors in all are shown in FIG. 5.

Figure 6:
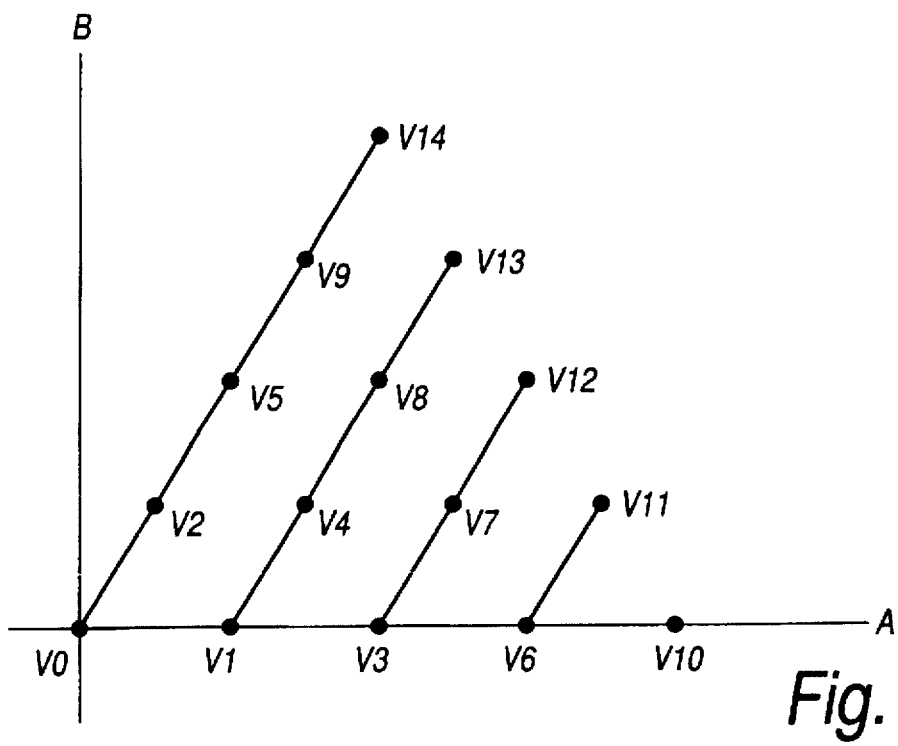
FIG. 6 is a diagram showing actual voltage vectors that are generated from actual voltage vector generating circuit 50 in the first embodiment shown in FIG. 1.

Actual voltage vector generating circuit 50 generates 15 actual voltage vectors as AB coordinate values in 60° sections shown in FIG. 6 as follows out of the 61 actual voltage vectors shown in FIG. 5:

$$V0 = (0,0) \times VMAX/4 \times 1.5$$
$$V1 = (1,0) \times VMAX/4 \times 1.5$$
$$V2 = (1/2, \sqrt{3}/2) \times VMAX/4 \times 1.5$$
$$V3 = (2,0) \times VMAX/4 \times 1.5$$
$$V4 = (1.5, \sqrt{3}/2) \times VMAX/4 \times 1.5$$
$$V5 = (1, \sqrt{3}) \times VMAX/4 \times 1.5$$
$$V6 = (3,0) \times VMAX/4 \times 1.5$$
$$V7 = (2.5, \sqrt{3}/2) \times VMAX/4 \times 1.5$$
$$V8 = (2, \sqrt{3}) \times VMAX/4 \times 1.5$$
$$V9 = (1.5, 3\sqrt{3}/2) \times VMAX/4 \times 1.5$$
$$V10 = (4,0) \times VMAX/4 \times 1.5$$
$$V11 = (3.5, \sqrt{3}/2) \times VMAX/4 \times 1.5$$
$$V12 = (3, \sqrt{3}) \times VMAX/4 \times 1.5$$
$$V13 = (2.5, 3\sqrt{3}/2) \times VMAX/4 \times 1.5$$
$$V14 = (2, 2\sqrt{3}) \times VMAX/4 \times 1.5$$

Here, VMAX represents the primary side phase voltage of transformer 1 at the maximum output.

Voltage vector selection circuit 40 selects the voltage vector to be actually generated at the primary side of transformer 1 by inputting a command voltage vector V (VA, VB) output from command voltage vector calculation circuit 30 and 15 actual voltage vectors V0–V14 generated in actual voltage vector generating circuit 50.

Figure 7:
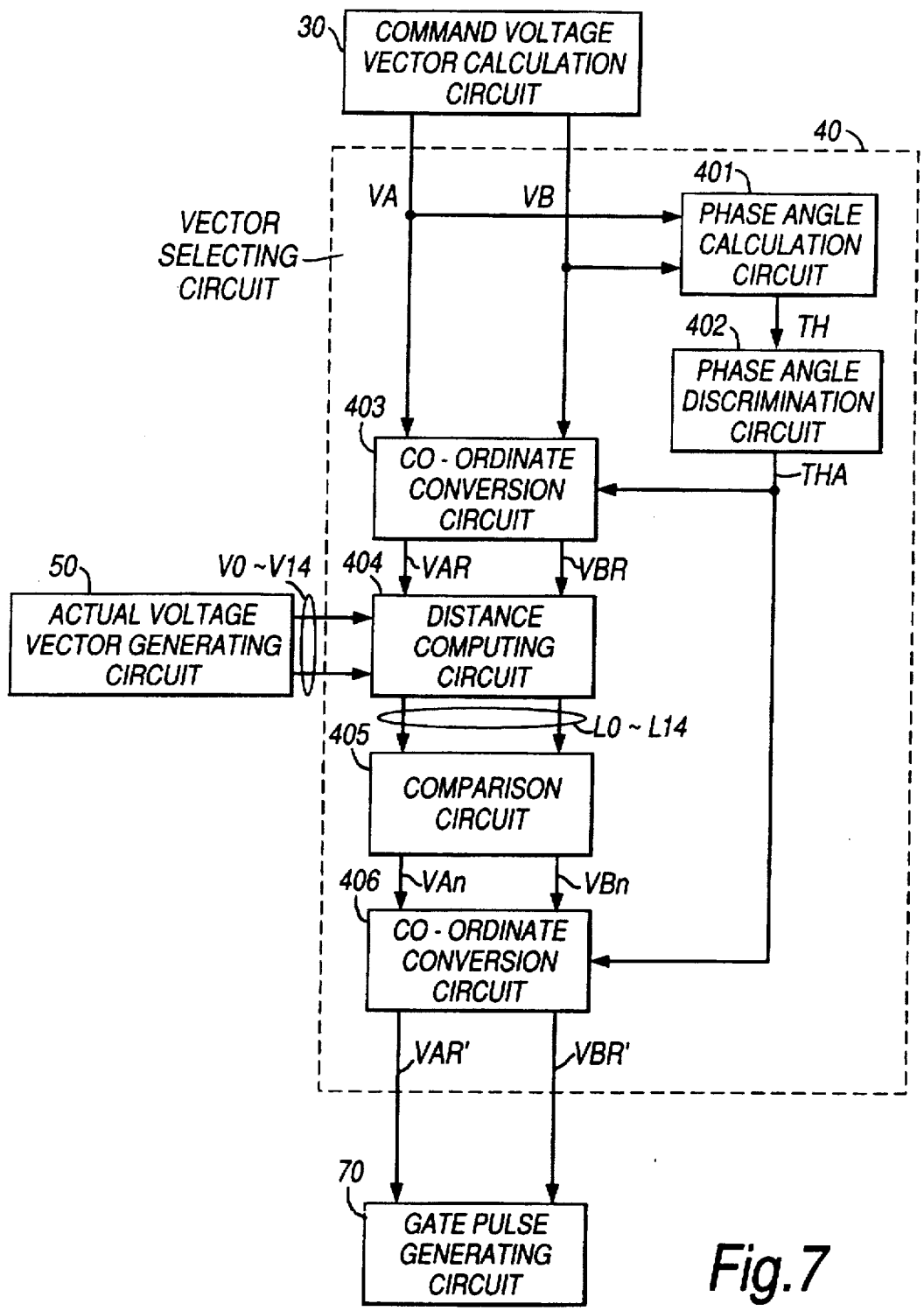
FIG. 7 is a block diagram showing a detailed construction of a voltage vector selecting circuit 40 in the first embodiment shown in FIG. 1.

FIG. 7 is a diagram for explaining the construction of voltage vector selecting circuit 40. From A, B coordinate values (VA, VB) of command voltage vector V output from command voltage vector calculation circuit 30, phase angle TH of command voltage vector V is computed by a phase angle calculation circuit 401 according to the following formulas:

When VA is positive and is larger than (an absolute value of VB):

$$TH = \tan^{-1}(VB/VA)$$

When VB is positive and is larger than (an absolute value of VA):

$$TH = -\tan^{-1}(VA/VB) + 90°$$

When VA is negative and is smaller than −(an absolute value of VB):

$$TH = \tan^{-1}(VB/VA) + 180°$$

When VB is negative and is smaller than −(an absolute value of VA):

$$TH = -\tan^{-1}(VB/VA) + 270°$$

A phase angle discrimination circuit 402 decides a phase angle THA representing one of six 60° sections to which voltage vector V belongs according to the following logic:

When $0° \leq TH < 60°$ THA=0°

When $60° \leq TH < 120°$ THA=60°

When $120° \leq TH < 180°$ THA=120°

When $180° \leq TH < 240°$ THA=180°

When $240° \leq TH < 300°$ THA=240°

When $300° \leq TH < 360°$ THA=300°

A coordinate conversion circuit 403 converts the coordinate of the command voltage vector V(VA, VB) to obtain a vector VR (VA/R, VBR) according to output THA of phase angle discrimination circuit 402 according to the following formulas:

$$VAR = VA \times \cos(THA) + VB \times \sin(THA)$$

$$VBR = -VA \times \sin(THA) + VB \times \cos(THA)$$

A distance computing circuit 404 computes distances L0–L14 between vector VR(VAR, VBR) which is the output of coordinate conversion circuit 403 and fifteen actual voltage vectors V0–V14 which are the outputs of actual voltage vector generating circuit 50, respectively, according to the following formulas:

$$L0 = \sqrt{(VAR^2 + VBR^2)}$$

$$L1 = \sqrt{(VAR - VA1)^2 + (VBR - VB1)^2}$$

$$L2 = \sqrt{(VAR - VA2)^2 + (VBR - VB2)^2}$$

-continued $$L3 = \sqrt{(VAR - VA3)^2 + (VBR - VB3)^2}$$

$$L4 = \sqrt{(VAR - VA4)^2 + (VBR - VB4)^2}$$

$$L5 = \sqrt{(VAR - VA5)^2 + (VBR - VB5)^2}$$

$$L6 = \sqrt{(VAR - VA6)^2 + (VBR - VB6)^2}$$

$$L7 = \sqrt{(VAR - VA7)^2 + (VBR - VB7)^2}$$

$$L8 = \sqrt{(VAR - VA8)^2 + (VBR - VB8)^2}$$

$$L9 = \sqrt{(VAR - VA9)^2 + (VBR - VB9)^2}$$

$$L10 = \sqrt{(VAR - VA10)^2 + (VBR - VB10)^2}$$

$$L11 = \sqrt{(VAR - VA11)^2 + (VBR - VB11)^2}$$

$$L12 = \sqrt{(VAR - VA12)^2 + (VBR - VB12)^2}$$

$$L13 = \sqrt{(VAR - VA13)^2 + (VBR - VB13)^2}$$

$$L14 = \sqrt{(VAR - VA14)^2 + (VBR - VB14)^2}$$

Here, VAn and VBn (n=1~14) are A and B components of actual voltage vectors Vn (n=1~14), respectively.

A comparison circuit 405 detects the minimum value of distances L0–L14 computed by distance computing circuit 404 between command voltage vector VR and actual voltage vectors V0–V14, and outputs AB coordinate value (VAn, VBn) of actual voltage vector corresponding to the detected minimum value. A coordinate conversion circuit 406 converts AB coordinate value (VAn, VBn) into a selected actual voltage vector VR'(VAR', VBR') based on output THA of phase angle discrimination circuit 402 according to the following formulas:

$$VAR' = VA \times \cos(THA) - VB \times \sin(THA)$$

$$VBR' = VA \times \sin(THA) + VB \times \cos(THA)$$

A logic circuit 60 decides voltage vectors to be output from unit converters 3A–3D according to the following logic:

Step 1)

Selected actual voltage vectors VR'(VAR', VBR'), that is the output of vector selection circuit 40 is decomposed into voltage vectors that are output from unit converters 3A–3D as shown below. Here, selected actual voltage vector VR' of vector selection circuit 40 is expressed by AB coordinate value (VAR', VBR'), and voltage vectors that are output from unit converters 3A–3D are expressed by numerals "0" to "6" shown in FIG. 4. Further, voltage vectors that are output from converters 3A–3D are expressed as one voltage vector set like [n1, n2, n3, n4], where n1, n2, n3, n4 are numerals between 0 and 6, respectively.

When (0,0)     [0,0,0,0]

When (1,0) × VMAX/4 × 1.5     [1,0,0,0]

-continued

When (1/2, $\sqrt{3}$ /2) × VMAX/4 × 1.5     [2,0,0,0]

When (2,0) × VMAX/4 × 1.5     [1,1,0,0]

When (1.5, $\sqrt{3}$ /2) × VMAX/4 × 1.5     [1,2,0,0]

When (1, $\sqrt{3}$) × VMAX/4 × 1.5     [2,2,0,0]

When (3,0) VMAX/4 × 1.5     [1,1,1,0]

When (2.5, $\sqrt{3}$ /2) × VMAX/4 × 1.5     [1,1,2,0]

When (2, $\sqrt{3}$) × VMAX/4 × 1.5     [1,2,2,0]

When (1.5,3 $\sqrt{3}$ /2) × VMAX/4 × 1.5     [2,2,2,0]

When (4,0) × VMAX/4 × 1.5     [1,1,1,1]

When (3.5, $\sqrt{3}$ /2) × VMAX/4 × 1.5     [1,1,1,2]

When (3, $\sqrt{3}$) × VMAX/4 × 1.5     [1,1,2,2]

When (2.5,3 $\sqrt{3}$ /2) × VMAX/4 × 1.5     [1,2,2,2]

When (2,2 $\sqrt{3}$) × VMAX/4 × 1.5     [2,2,2,2]

Shown above are the voltage vectors of the composite outputs and the outputs of unit converter 3A–3D when the terminal of voltage vectors are between axis A and a line forming 60° from axis A. Other selected actual voltage vectors VR'(VAR', VBR') are decomposed into voltage vectors that are output by unit converters 3A–3D in the similar manner.

Step 2)

The present output voltage vectors of unit converters 3A, 3B, 3C and 3D are checked in order, and a set of voltage vectors are allocated to unit converters 3A, 3B, 3C and 3D that are to be output from unit converters 3A, 3B, 3C and 3D. For instance, if the present output voltage vectors of the converters 3A, 3B, 3C and 3D are, Converter 3A: 1, Converter 3B: 2, Converter 3C: 2, Converter 3D: 1, and a voltage vector set to be output from each of unit converters 3A, 3B, 3C and 3D is assumed to be [1,2,2,2].

(1) The present output voltage vector of converter 3A is 1, and as voltage vector 1 is included in the voltage vector set, the next output voltage vector of converter 3A is determined to be 1, and vector 1 is excluded from the voltage vector set.

The new voltage vector set will become [2,2,2].)

(2) The present output voltage vector of converter 3B is 2, and as voltage vector 2 is included in the voltage vector set, the next output voltage vector of converter 3B is determined to be 2, and vector 2 is excluded from the voltage vector set.

(The new voltage vector set will becomes [2,2].)

(3) The present output voltage vector of converter 3C is 2, and as voltage vector 2 is included in the voltage vector set, the next output voltage vector of converter 3B is determined to be 2, and vector 2 is excluded from the voltage vector set.

(The new voltage vector set will becomes [2].)

(4) The present output voltage vector of converter 3D is 1 and voltage vector 1 is not included in the present voltage vector set. So, voltage vector 2 remained in the voltage vector set is allocated to converter 3D as the next output vector.

In this example, only one voltage vector is left in the voltage vector set when the present output voltage vector is not included in the voltage vector set. If there are plural voltage vectors left, the first vector in the voltage vector set is to be allocated.

Logic circuit 60 further generates ON/OFF commands of GTOs according to the relationship, shown in the Table, between the voltage vectors allocated as described above and the switching state of GTOs. Gate pulse generating circuit 70 generates gate pulses to GTOs in converters 3A–3D based on the ON/OFF commands of logic circuit 60.

Figure 8:
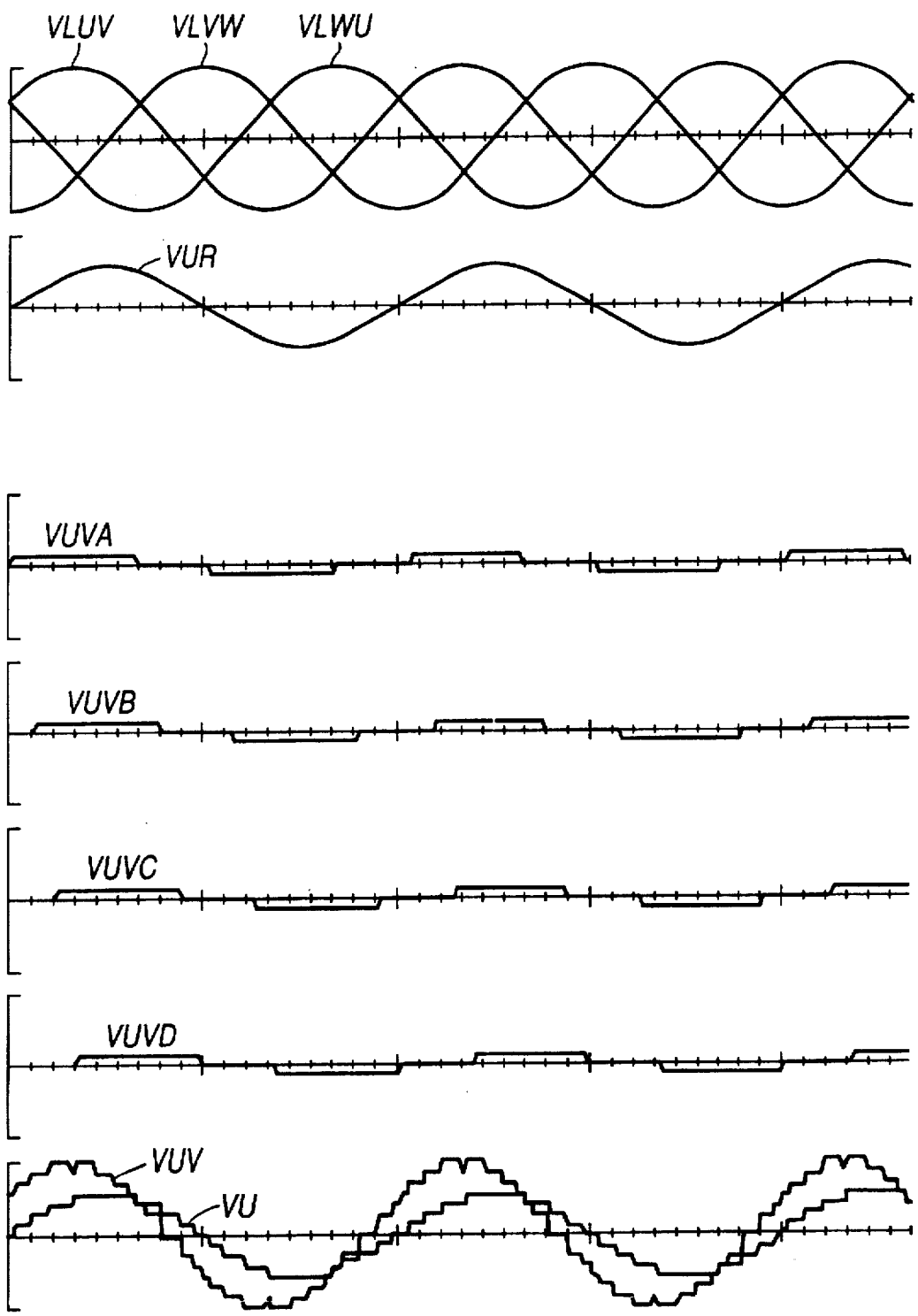
FIG. 8 is a waveforms diagram for explaining the operation of the first embodiment shown in FIG. 1.

FIG. 8 shows waveforms generated from the operation of the control system as described above.

According to this embodiment, as the converters 3A, 3B, 3C and 3D are controlled so as to generate voltages corresponding to an actual voltage vector that is the closest to a voltage vector corresponding to a three-phase AC voltage command, a sine wave shaped voltage is generated at the primary side of transformer 1. Further, each of GTOs of the unit converters 3A, 3B, 3C and 3D repeats one time of ON/OFF switching per period and the number of switchings become 1/9 times that of the method described according to a conventional technique. As a result, the switching loss of converters 3A, 3B, 3C and 3D is reduced and the highly efficient power conversion system can be provided.

Figure 9:
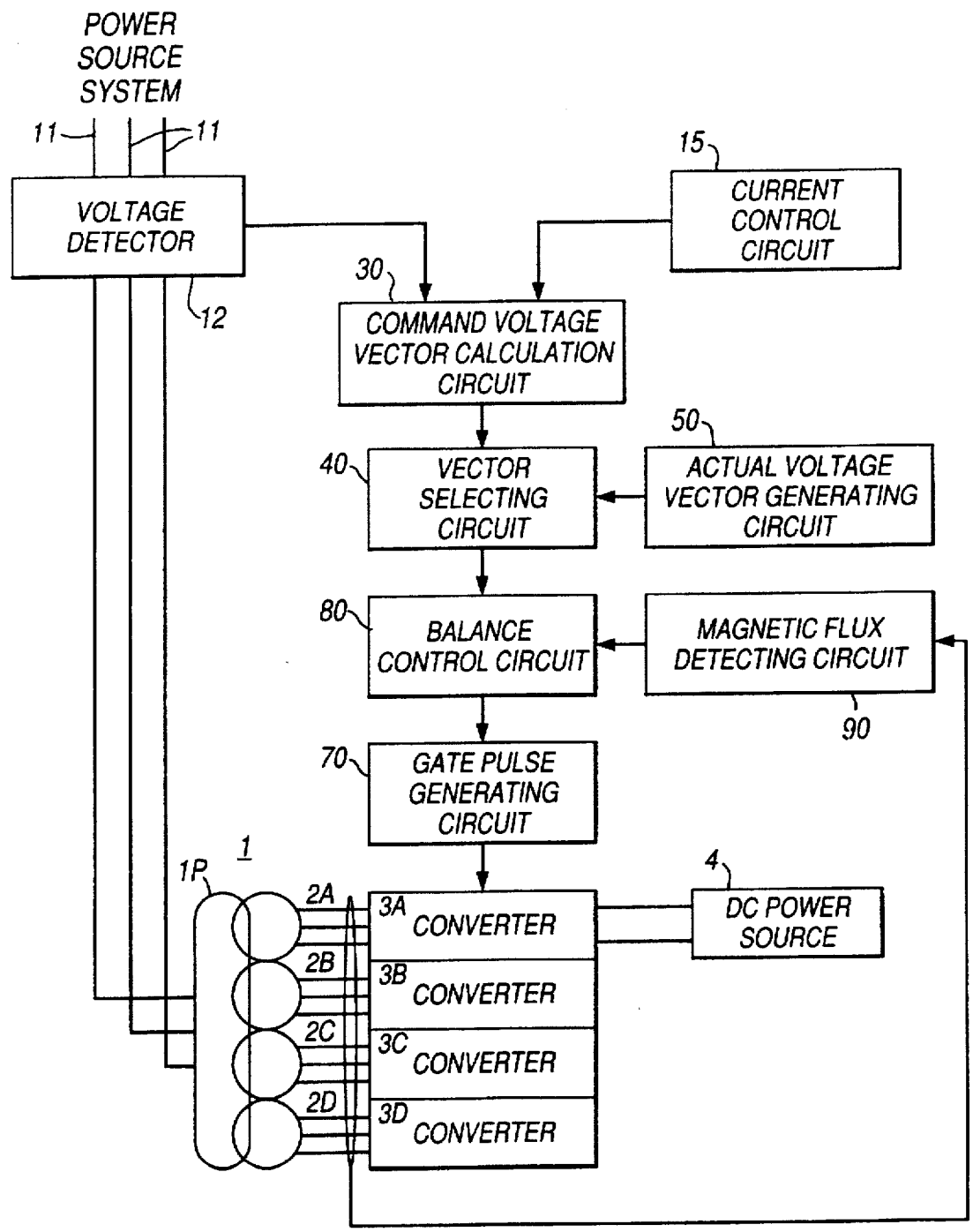
FIG. 9 is a block diagram showing a control system for a power conversion system according to a second embodiment of this invention.

FIG. 9 is a block diagram showing the construction of a control system for a power conversion system according to a second embodiment of the present invention.

In this figure, 80 is a balance control circuit to control magnetic fluxes interlinking to secondary windings 2A–2D of transformer 1 so as to balance them. 90 is a magnetic flux detecting circuit to detect quantities equivalent to magnetic fluxes interlinking to secondary windings 2A–2D of transformer 1.

Figure 10:
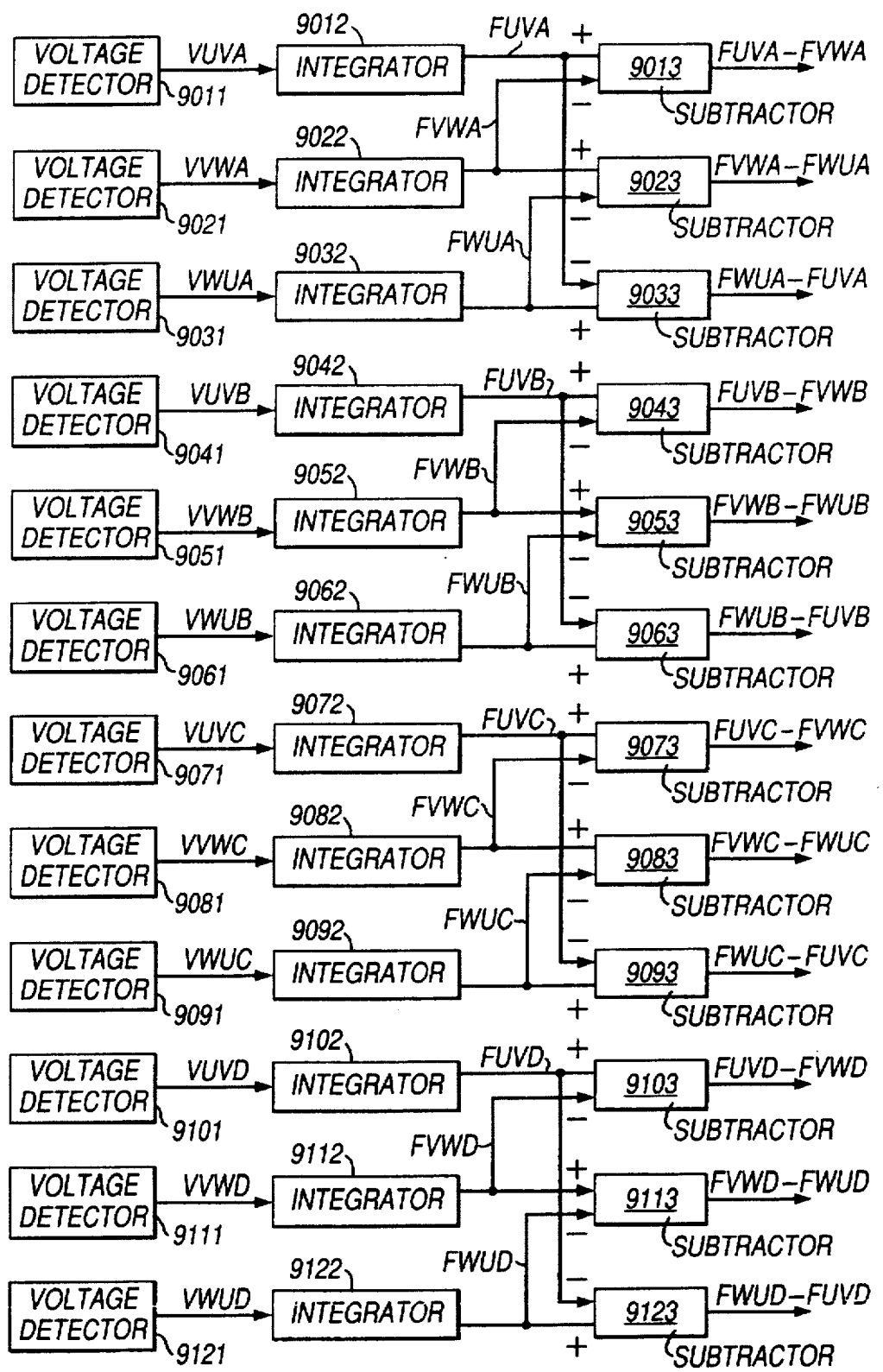
FIG. 10 is a block diagram showing a detailed construction of a magnetic flux detecting circuit 90 in the second embodiment shown in FIG. 9.

FIG. 10 is a block diagram showing the construction of magnetic flux detecting circuit 90.

Magnetic flux detecting circuit 90 is composed of voltage detectors 9011–9121 to detect voltages applied to three windings of secondary windings 2A–2D of transformer 1, respectively, integrators 9012–9122 to integrate the respective outputs of voltage detectors 9011–9121 and subtractors 9013–9023 to compute differences between the two outputs of the integrators 9013–9123, respectively.

Figure 11:
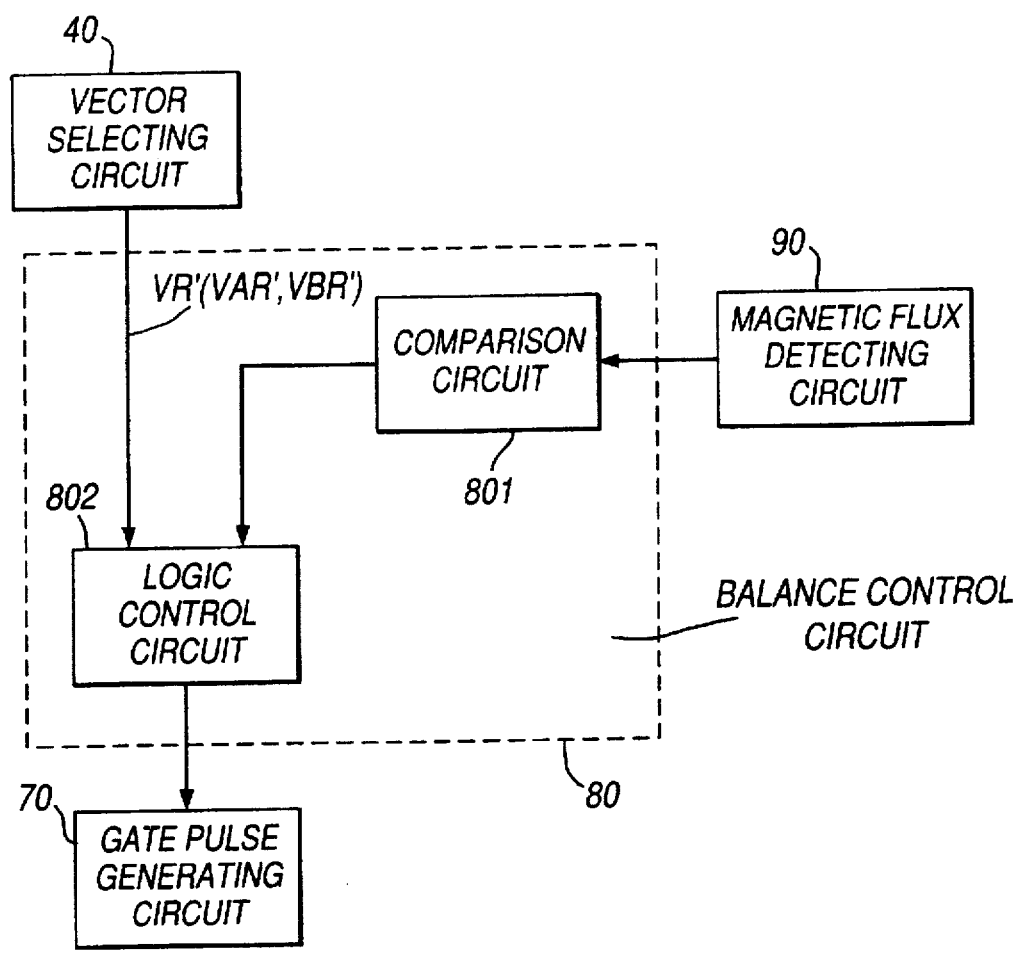
FIG. 11 is a block diagram showing a detailed construction of a balance control circuit 80 in the second embodiment shown in FIG. 9.

Balance control circuit 80 shown in FIG. 11 is composed of a comparison circuit 801 to decide the order in the magnitudes of the outputs of magnetic flux detecting circuit 90 and a logic circuit 802 to decide voltage vectors to be output by unit converters 3A–3D from the output of comparison circuit 801 and the output of vector selection circuit 40.

Next, the detailed construction of the second embodiment will be explained. In FIG. 9 the construction until selected actual voltage vector VR'(VAR', VBR') is output by vector selection circuit 40 are the same as those of the first embodiment and so, the explanation thereof will be omitted here.

Magnetic flux detecting circuit 90 operates as shown below and obtains quantities equivalent to differences between UV-phase magnetic fluxes and VW-phase magnetic fluxes of secondary windings 2A–2D of transformer 1, respectively.

By detecting voltage VUVA applied to UV-phase of secondary winding 2A of transformer 1 by voltage detector 9011 and then, integrating its output VUVA by integrator 9012, a quantity FUVA equivalent to UV-phase magnetic flux in secondary winding 2A is obtained.

By detecting voltage VVWA applied to VW-phase of secondary winding 2A of transformer 1 by voltage detector 9021 and then, integrating its output VVWA by integrator 9022, a quantity FVWA equivalent to VW-phase magnetic flux in secondary winding 2A is obtained.

A difference FUVA–FVWA between the outputs of integrators 9012 and 9022 is computed by subtractor 9013. By detecting voltage VUVB applied to UV-phase of secondary winding 2B of transformer 1 by voltage detector 9041 and then, integrating its output VUVB by integrator 9042, a quantity FUVB equivalent to UV-phase magnetic flux in secondary winding 2B is obtained.

By detecting voltage VVWB applied to VW-phase of secondary winding 2B of transformer 1 by voltage detector 9051 and then, integrating its output VVWB by integrator 9052, a quantity FVWB equivalent to VW-phase magnetic flux in secondary winding 2B is obtained.

A difference FUVB–FVWB between the outputs of integrators 9042 and 9052 is computed by subtractor 9043. By detecting voltage VUVC applied to UV-phase of secondary winding 2C of transformer 1 by voltage detector 9071 and then, integrating its output VUVC by integrator 9072, a quantity FUVC equivalent to UV-phase magnetic flux in secondary winding 2C is obtained.

By detecting voltage VVWC applied to VW-phase of secondary winding 2C of transformer 1 by voltage detector 9081 and then, integrating its output VVWC by integrator 9082, a quantity FVWC equivalent to VW-phase magnetic flux in secondary winding 2C is obtained.

A difference FUVC–FVWC between the outputs of integrators 9072 and 9082 is computed by subtractor 9073. By detecting voltage VUVD applied to UV-phase of secondary winding 2D of transformer 1 by voltage detector 9101 and then, integrating its output VUVD by integrator 9102, a quantity FUVD equivalent to UV-phase magnetic flux in secondary winding 2D is obtained.

By detecting voltage VVWD applied to VW-phase of secondary winding 2D of transformer 1 by voltage detector 9111 and then, integrating its output VVWD by integrator 9112 a quantity FVWD equivalent to VW-phase magnetic flux in secondary winding 2D is obtained.

A difference FUVD–FVWD between the outputs of integrators 9102 and 9112 is computed by subtractor 9103. As to quantities FVWA–FWUA, FVWB–FWUB, FVWC–FWUC and FVWD–FWUD equivalent to respective differences between VW-phase magnetic fluxes and WU-phase magnetic fluxes of secondary windings 2A–2D of transformer 1, and quantities FWUA–FUVA, FWUB–FUVB, FWUC–FUVC and FWUD–FUVD equivalent to respective differences between WU-phase magnetic fluxes and UV-phase magnetic fluxes of secondary windings 2A–2D of transformer 1 are obtained, in the same manner as shown above.

In balance control circuit 80, comparison circuit 801 decides the order in the magnitudes of quantities FUVA–FVWA, FUVB–FVWB, FUVC–FVWC, and FUVD–FVWD output from magnetic flux detecting circuit 90, which are equivalent to differences between UV-phase and VW-phase magnetic fluxes of secondary windings 2A–2D of transformer 1. Comparison circuit 801 further decides the order in the magnitudes of quantities FVWA–FWUA, FVWB–FWUB, FVWC–FWUC and FVWD–FWUD equivalent to differences between VW-phase and WU-phase magnetic fluxes of secondary windings 2A–2D, and further decides the order in the magnitudes of quantities FWUA–FUVA, FWUB–FUVB, FWUC–FUVC and FWUD–FUVD equivalent to differences between WU-phase and UV-phase magnetic fluxes of secondary windings 2A–2D.

Logic circuit 802 computes voltage vector set, such as [1,1,4,5], to be output by unit converters 3A–3D from output VR'(VAR', VBR') of vector selecting circuit 40 in the same manner as explained in logic circuit 60 of the first embodiment. Then logic circuit 802 allocates respective voltage vectors in the voltage vector set to unit converters 3A–3D based on the output of comparison circuit 801 according to the logic shown below.

Firstly, a first vector in the voltage vector set is checked.

Step A: If that vector is Vector 1, allocate Vector 1 to the converter having the minimum value among quantities FUVA–FVWA, FUVB–FUWB, FUVC–FVWC and FUVD–FVWD equivalent to respective differences between UV-phase and VW-phase magnetic fluxes interlinking to secondary windings 2A–2D, among converters 3A–3D.

Step B: If that vector is Vector 2, allocate Vector 2 to the converter having the maximum value among quantities FWUA–FUVA, FWUB–FUVB, FWUC–FUVC and FWUD–FUVD equivalent to respective differences between WU-phase and UV-phase magnetic fluxes interlinking to secondary windings 2A–2D, among converters 3A–3D.

Step C: If that vector is Vector 3, allocate Vector 3 to the converter having the minimum value among quantities FVWA–FWUA, FVWB–FWUB, FVWC–FWUC and FVWD–FWUD equivalent to respective differences between VW-phase and WU-phase magnetic fluxes interlinking to secondary windings 2A–2D, among converters 3A–3D.

Step D: If that vector is Vector 4, allocate Vector 4 to the converter having the maximum value among quantities FUVA–FVWA, FUVB–FVWB, FUVC–FVWC and FUVD–FVWD equivalent to differences between UV-phase and VW-phase magnetic fluxes interlinking to secondary windings 2A–2D, among converters 3A–3D.

Step E: If that vector is Vector 5, allocate Vector 5 to the converter having the minimum value among quantities FWUA–FUVA, FWUB–FUVB, FWUC–FUVC and FWUD–FUVD equivalent to respective differences between WU-phase and UV-phase magnetic fluxes interlinking to secondary windings 2A–2D, among converters 3A–3D.

Step F: If that vector is Vector 6, allocate Vector 6 to the converter having the maximum value among quantities FVWA–FWUA, FVWB–FWUB, FVWC–FWUC and FVWD–FWUD equivalent to respective differences between VW-phase and WU-phase magnetic fluxes interlinking to secondary windings 2A–2D, among converters 3A–3D.

Step G: When that vector in the voltage vector set is allocated to one of converters 3A–3D, the three quantities equivalent to respective three differences between UV-phase and VW-phase, VW-phase and WU-phase, and WU-phase and UV-phase magnetic fluxes in one of the secondary windings 2A–2D of the converter to which the voltage vector has been allocated are deleted from each of three orders decided by comparison circuit 801.

Step H: Then, a second vector in the voltage vector set is checked. The second vector is allocated the same manner as the first vector as shown in step A through step G.

Step I, J: A third vector and a fourth vector in the voltage vector set are checked and allocated the same manner as the second vector.

If the vector in the voltage vector set is Vector 0, allocate Vector 0 to all the remaining converters 3A–3D to which the vector is not allocated.

The operation of balance control circuit 80 is further described in detail with reference to an example.

It is assumed that voltage vector set [1,1,4,5] is generated in logic circuit 802 based on output VR'(VAR', VBR') of vector selecting circuit 40.

Firstly, a first vector in the voltage vector set [1,1,4,5] is checked. In step A, it is assumed that quantity FUVB–FVWB is minimum. A first vector in the voltage vector set [1,1,4,5] is vector 1, so that vector 1 is allocated to converter 3B. In step G, quantities FUVB–FVWB, FVWB–FWUB and FWUB–FUVB with respect to secondary winding 2B are deleted from each of three orders decided by comparison circuit 801.

Secondly, a second vector in the voltage vector set [1,1, 4,5] is checked. In step A, it is further assumed that quantity FUVD–FVWD is minimum. A second vector is also vector 1, so that vector 1 is allocated to converter 3D. In step G, quantities FUVD–FVWD, FVWD–FWUD and FWUD–FUVD are detected from each of three orders decided by comparison circuit 801.

Thirdly, a third vector is checked. In step D, it is assumed that quantity FUVC–FVWC is maximum. A third vector is vector 4, so that vector 4 is allocated to converter 3C. In step G, quantities FUVC–FVWC, FVWC–FWUC and FWUC–FUVC are deleted from each of three orders decided by comparison circuit 801.

Fourthly, a fourth vector is vector 5, so that vector 5 is allocated to converter 3A in step E.

As described above, in this example, voltage vectors 5, 1, 4 and 1 are respectively allocated to converters 3A, 3B, 3C and 3D from voltage vector set [1,1,4,5].

Logic circuit 802 further generates ON/OFF commands of GTOs according to the relationship, shown in the Table, between the voltage vectors allocated as described above and the switching state of GTOs.

Gate pulse generating circuit 70 generates gate pulses to GTOs in converter 3A–3D based on the ON/OFF commands outputted from balance control circuit 80.

Figure 12:
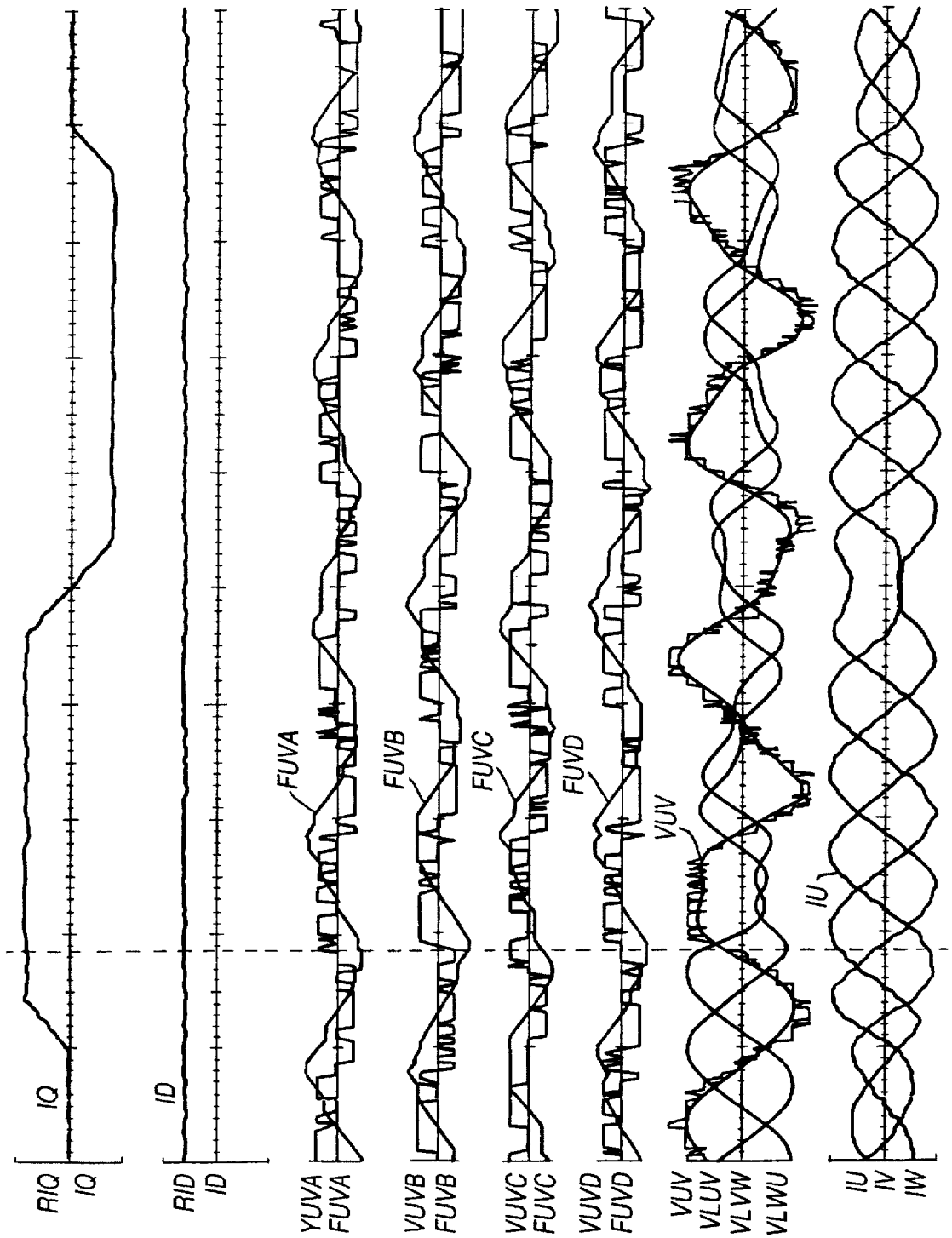
FIG. 12 is a waveforms diagram for explaining the operation of the second embodiment shown in FIG. 9.

FIG. 12 shows waveforms generated by the operation of the second embodiment described above.

According to this embodiment, as the converters 3A–3D are controlled so as to generate voltages corresponding to an actual voltage vector that is the closest to a voltage vector corresponding to a three-phase voltage command, a sine wave shaped voltage is generated at the primary side of transformer 1. Furthermore, as quantities equivalent to magnetic fluxes interlinking to the secondary windings 2A–2D of the transformer 1 are detected and the ON/OFF switching of the self-turn-off switching devices of unit converters 3A–3D is controlled according to the set of voltage vectors to be output from unit converters 3A–3D and the magnitudes of the quantities equivalent to magnetic fluxes so as to balance the quantities equivalent to magnetic fluxes interlinking to secondary windings 2A–2D. As a result, the voltages applied to the secondary windings 2A–2D can be controlled so that no DC components are generated.

Figure 22:
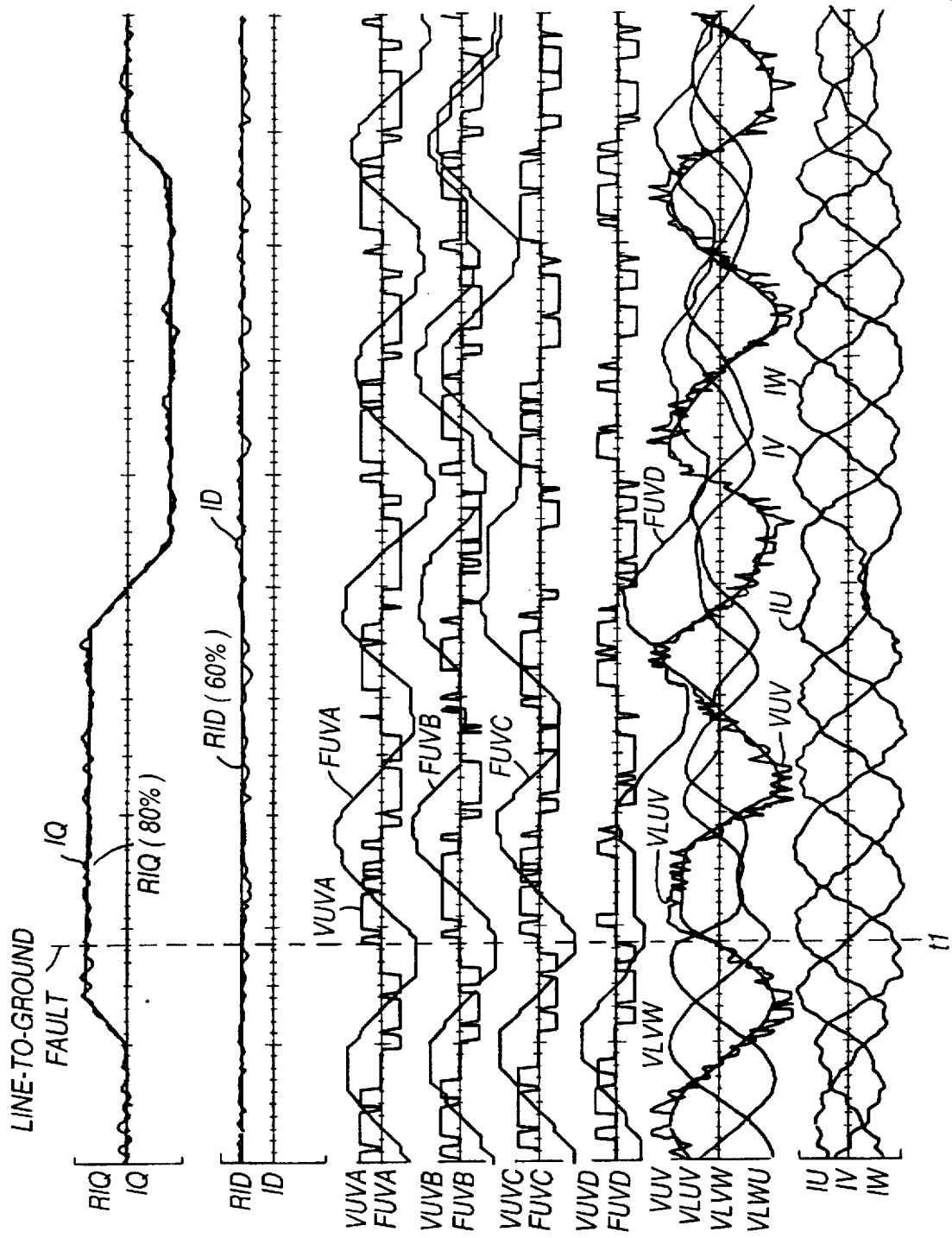
FIG. 22 is a waveforms diagram for explaining the operation of the conventional control system shown in FIG. 19.

In FIG. 22 showing the conventional operating waveforms, quantities FUVC and FUVD diverge heavily in the positive and negative directions, respectively. In this embodiment, however, it is clear from FIG. 12 that waveforms of quantities FUVC and FUVD are greatly improved and do not diverge in any of positive and negative directions, respectively. Accordingly, even when system voltage is sharply distorted by a system line-to-ground fault, etc., it is possible to continuously operate converters 3A–3D without saturating transformer 1.

In the second embodiment, as a means to detect quantities equivalent to magnetic fluxes interlinking to secondary windings 2A–2D of transformer 1, a means to detect and integrate voltages applied to secondary windings 2A–2D of transformer 1 by voltage detectors 9011–9121 and integrators 9012–9122 shown in FIG. 10 is explained. But a method to detect quantities equivalent to magnetic fluxes may be used as described below.

Figure 13:
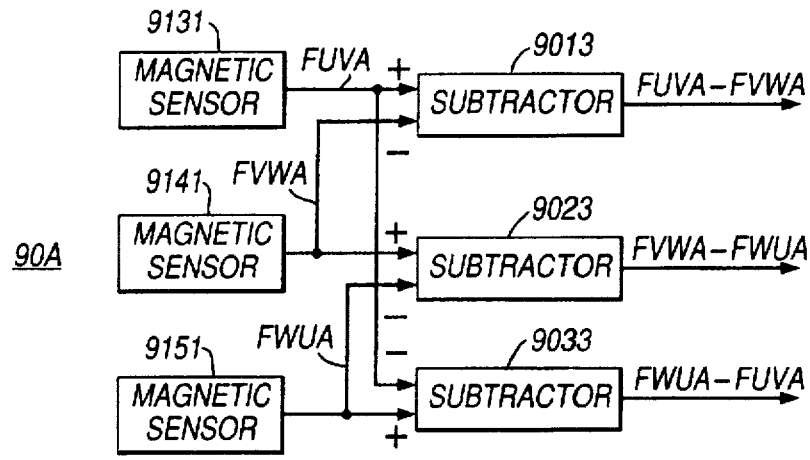
FIG. 13 is a block diagram showing a part of detailed construction of a magnetic flux detecting circuit 90A according to a first modification of this invention.

FIG. 13 is a block diagram showing the construction of a magnetic flux detecting circuit 90A according to a first modification of this invention. Magnetic flux detecting circuit 90A is to obtain the same effect as that described in the second embodiment by directly detecting magnetic fluxes by magnetic sensors by providing them in the magnetic paths of secondary windings 2A–2D of the transformer 1 to detect respective quantities equivalent to magnetic fluxes interlinking to the secondary windings 2A–2D of transformer 1.

In FIG. 13, magnetic flux detecting circuit 90A is composed of magnetic sensors 9131, 9141 and 9151 to detect quantities FUVA, FVWA and FWUA which are equivalent to magnetic fluxes of UV-phase, VW-phase and WU-phase of secondary winding 2A in transformer 1, respectively. Magnetic flux detecting circuit 90A is further composed of subtractors 9013, 9023 and 9033 to compute differences FUVA–FVWA, FVWA–FWUA and FWUA–FUVA, respectively, which are applied to balance control circuit 80.

This figure only shows the construction with respect to secondary winding 2A of transformer 1, and the construction with respect to secondary windings 2B–2D of transformer 1 should be made in the same manner.

Figure 14:
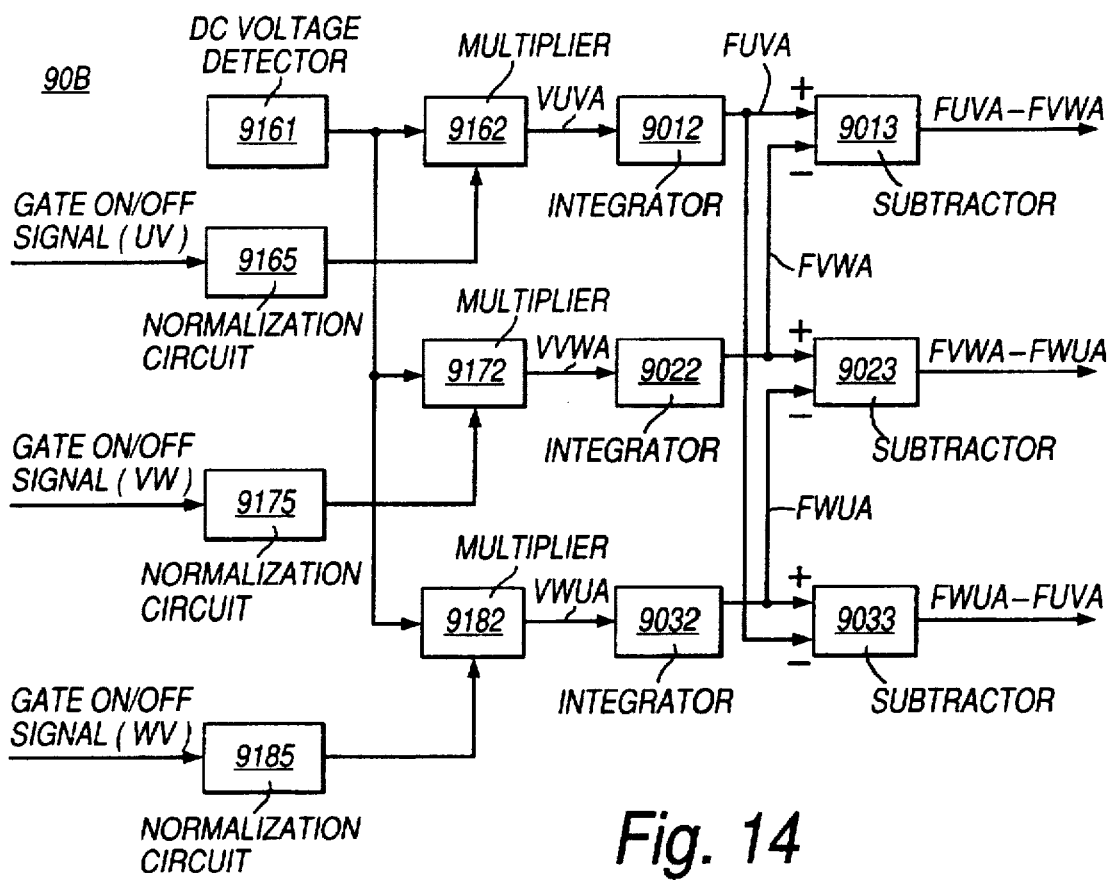
FIG. 14 is a block diagram showing a part of detailed construction of a magnetic flux detecting circuit 90B according to a second modification of this invention.

FIG. 14 is a block diagram showing the construction of a magnetic flux detecting circuit 90B according to a second modification of this invention.

Voltage of DC power source 4 is detected by a DC voltage detector, the GTO ON/OFF signals generated in gate pulse generating circuit 70 is converted into the ON/OFF signals of amplitude 1 in normalization circuits, and DC voltage and normalized ON/OFF signals are multiplied by multipliers, respectively. By integrating these results by integrators, quantities equivalent to magnetic fluxes interlinking to secondary windings 2A–2D of transformer 1 are obtained.

In FIG. 14, magnetic flux detecting circuit 90B is composed of a DC voltage detector 9161 to detect DC voltage of DC power source 4, normalization circuits 9165, 9175 and 9185 for converting GTO ON/OFF signals in the UV-phase, VW-phase and WU-phase into ON/OFF signals of amplitude 1, respectively. Magnetic flux detecting circuit 90B is further composed of multipliers 9162, 9172 and 9182 for multiplying the outputs of normalization circuits 9165, 9175 and 9185 by the DC voltage detected by DC voltage detector 9161, respectively, to generate voltages VUVA, VUWA and VWUA. Magnetic flux detecting circuits 90B is also composed of integrators 9012, 9022 and 9032 and subtractors 9013, 9023 and 9033, thereby to obtain differences FUVA–FVWA, FVWA–FWUA and FWUA–FUVA, respectively, which are applied to balance control circuit 80.

This figure only shows the construction with respect to secondary winding 2A of transformer 1, and the construction with respect to secondary windings 2B–2D of transformer 1 should also be made in the same manner.

According to this modification, it is possible to detect the quantity equivalent to magnetic flux using DC voltage detector 9161 that is used in DC voltage control of the power conversion system. Accordingly, it is possible to obtain the same effect as the second embodiment without newly providing voltage detectors 9011–9121.

Figure 15:
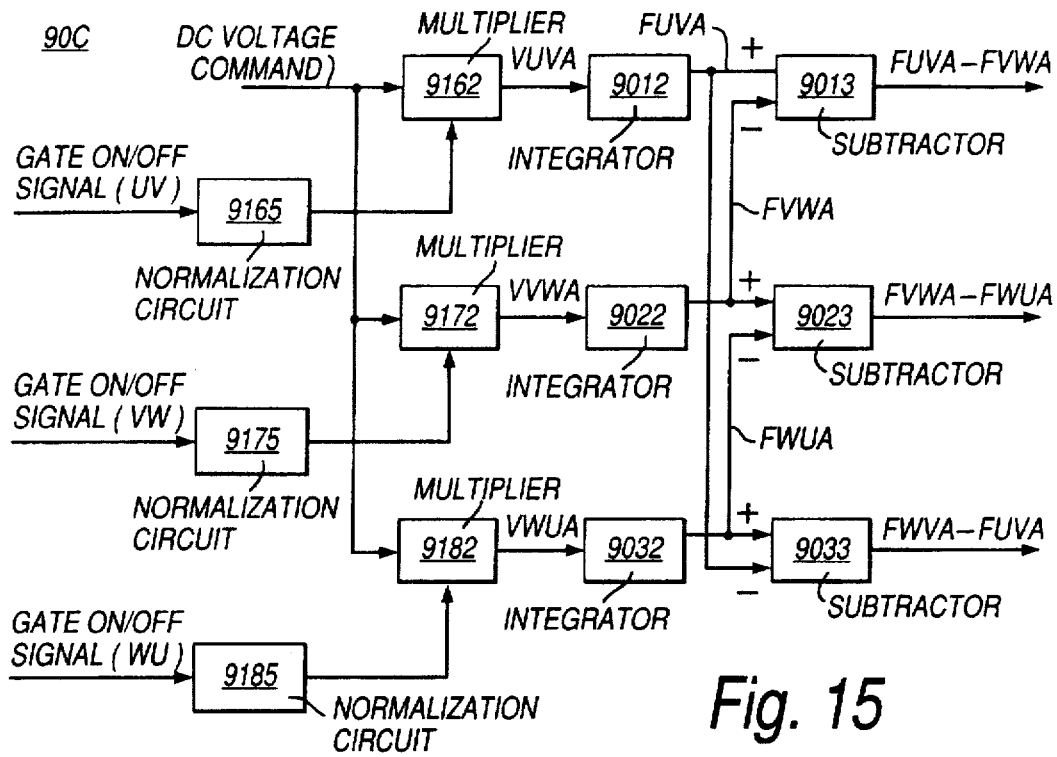
FIG. 15 is a block diagram showing a part of detailed construction of a magnetic flux detecting circuit 90C according to a third modification of this invention.

FIG. 15 is a block diagram showing the construction of a magnetic flux detecting circuit 90C according to a third modification of this invention. In magnetic flux detecting circuit 90C, the DC voltage command generated from DC voltage command generating circuit (not shown) to control DC voltage of DC power source 4 and gate ON/OFF signals obtained in normalization circuits 9165, 9175 and 9185 by normalizing the GTO ON/OFF signals generated in gate pulse generating circuit 70 to amplitude 1 are multiplied by multipliers 9191, 9201 and 9211, respectively. By integrating these result by integrators 9012, 9022 and 9032, quantities FUVA, FVWA and FWUA equivalent to magnetic fluxes interlinking to secondary windings 2A–2D of transformer 1 is obtained.

In this figure, only the construction with respect to secondary winding 2A of transformer 1 is shown, and the construction with respect to secondary windings 2B–2D of transformer 1 should also be made in the same manner.

According to this modification, it is possible to obtain the same effect as the second embodiment without newly providing voltage detectors 9011–9121.

Figure 16:
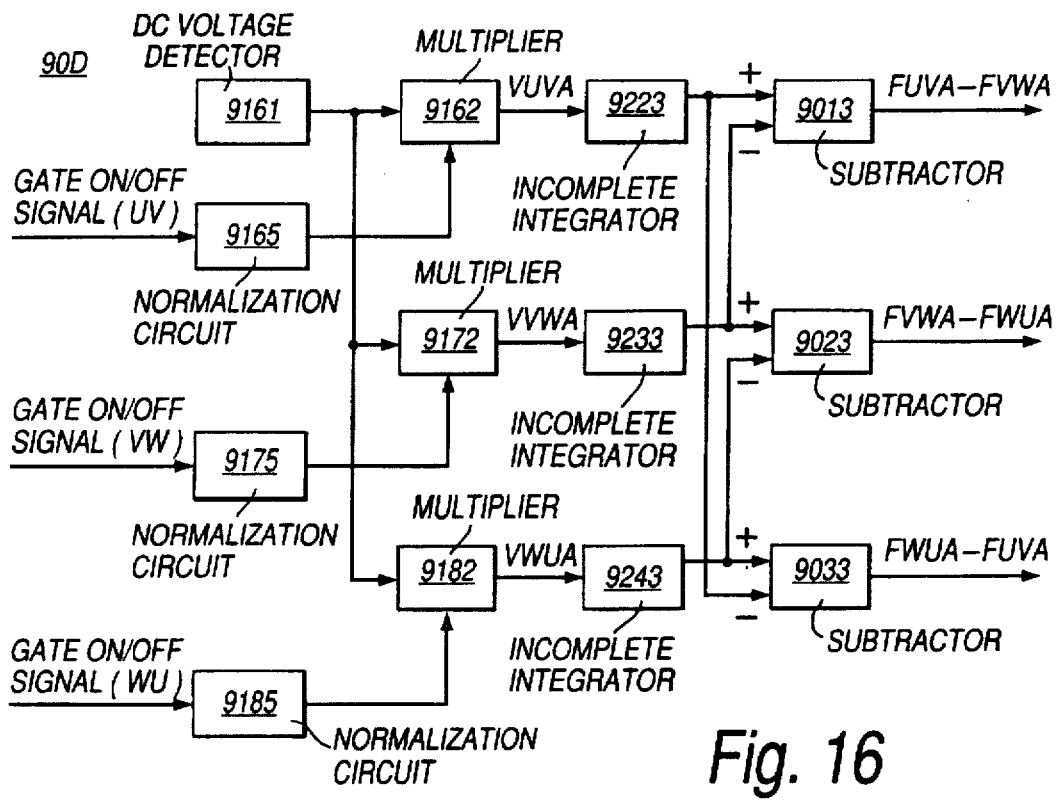
FIG. 16 is a block diagram showing a part of detailed construction of a magnetic flux detecting circuit 90D according to a fourth modification of this invention.

FIG. 16 is a block diagram showing the construction of a magnetic flux detecting circuit 90D according to a fourth modification of this invention. In FIG. 16, DC voltage of DC power source 4 is detected by the DC voltage detector, the GTO ON/OFF signals generated in gate pulse generating circuit 70 is converted into the ON/OFF signals in amplitude 1 in normalization circuits, and DC voltage and the normalized ON/OFF signals are multiplied by the multipliers, respectively. By incompletely integrating these results by incomplete integrators, quantities equivalent to magnetic fluxes interlinking to secondary windings 2A–2D of transformer 1 are obtained.

In FIG. 16, magnetic flux detecting circuit 90D is composed by substituting integrators 9012, 9022 and 9032 in magnetic flux detecting circuit 90B shown in FIG. 14 by incomplete integrators 9223, 9233 and 9243, respectively. In incomplete integrators 9223, 9233 and 9243, a time constant of incomplete integration is brought into line with the vanishing characteristic of the magnetic flux in transformer 1.

This figure only shows the construction with respect to secondary winding 2A of the transformer 1, and the construction with respect to secondary windings 2B–2D of transformer 1 should also be made in the same manner.

According to this modification, it is possible to detect the quantity equivalent to magnetic flux using DC voltage detector 9161 that is used in the control of DC voltage of the power conversion system. Accordingly, it is possible to obtain the same effect as the second embodiment without newly providing voltage detectors 9011–9121. Further effect can be expected to avoid the detected quantity equivalent to magnetic flux from being distorted by transient voltage when starting the power conversion system.

Furthermore, according to this modification as a time constant of incomplete integration is brought into line with the vanishing characteristic of magnetic flux, it is possible to compute magnetic fluxes interlinking to secondary windings 2A–2D of transformer 1 more accurately and thus, improve the effect of the second embodiment.

Figure 17:
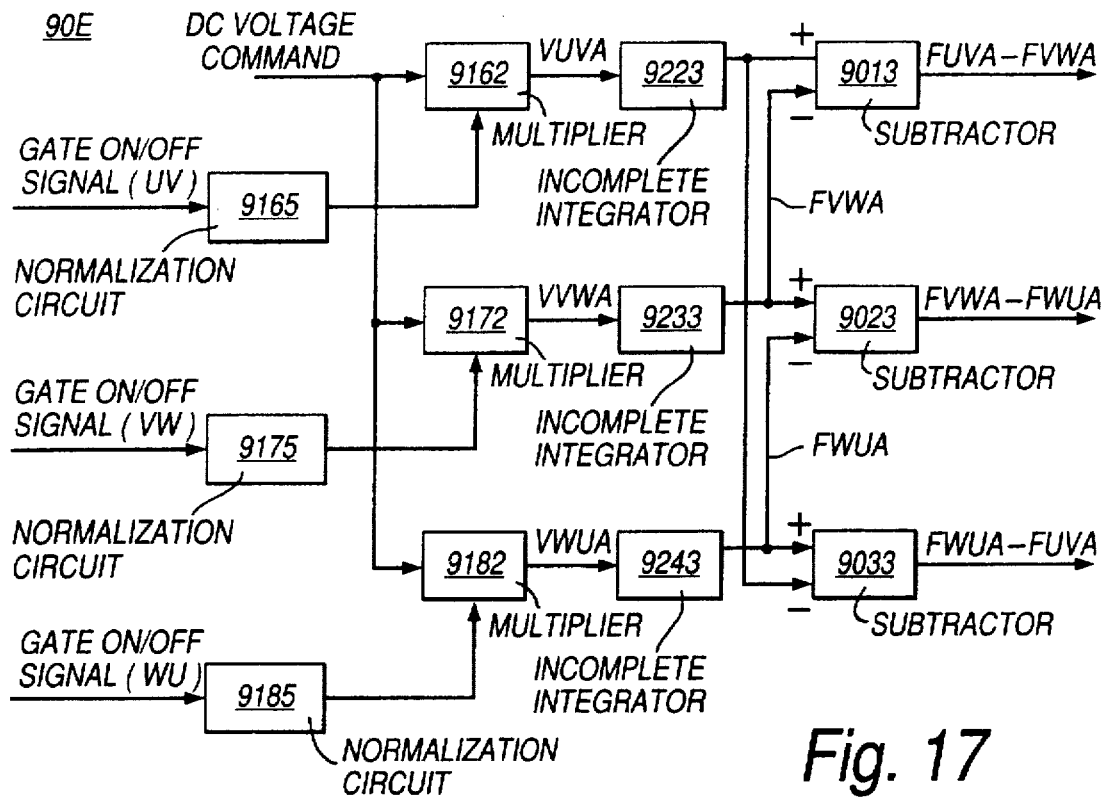
FIG. 17 is a block diagram showing a part of detailed construction of a magnetic flux detecting circuit 90E according to a fifth modification of this invention.

FIG. 17 is a block diagram showing the construction of a magnetic flux detecting circuit 90E according to a fifth modification of this invention. In FIG. 17, the DC voltage command to control DC voltage of DC power source 4 and the ON/OFF signals obtained by normalizing the GTO ON/OFF signals generated in gate pulse generating circuit 70 to amplitude 1 in normalization circuits are multiplied by the multipliers, respectively. By incompletely integrating these results by incomplete integrators, quantities equivalent to magnetic fluxes interlinking to secondary windings 2A-2D of transformer 1 are obtained.

In FIG. 17, magnetic flux detecting circuit 90E is composed by substituting integrators 9012, 9022 and 9032 in magnetic flux detecting circuit 90C shown in FIG. 15 by incomplete integrators 9223, 9233 and 9243, respectively. In incomplete integrators 9223, 9233 and 9243, a time constant of incomplete integration is brought into line with the vanishing characteristic of the magnetic flux in transformer 1.

This figure only shows the construction with respect to secondary winding 2A of transformer 1, and the construction with respect to secondary windings 2B-2D of transformer 1 should also be made in the same manner.

According to this modification, it is possible to obtain the quantity equivalent to magnetic flux without newly providing voltage detectors 9011-9121. Accordingly, it is possible to obtain the same effect as the second embodiment. Further effect can be expected to avoid detected quantity equivalent to magnetic flux from being distorted by transient voltage when starting the power conversion system.

Furthermore, according to this modification, as a time constant of the incomplete integration is brought in line with the vanishing characteristic of magnetic flux, it is possible to compute magnetic fluxes interlinking to secondary windings 2A-2D of transformer 1 more accurately, and improve the effect of the second embodiment.

Figure 18:
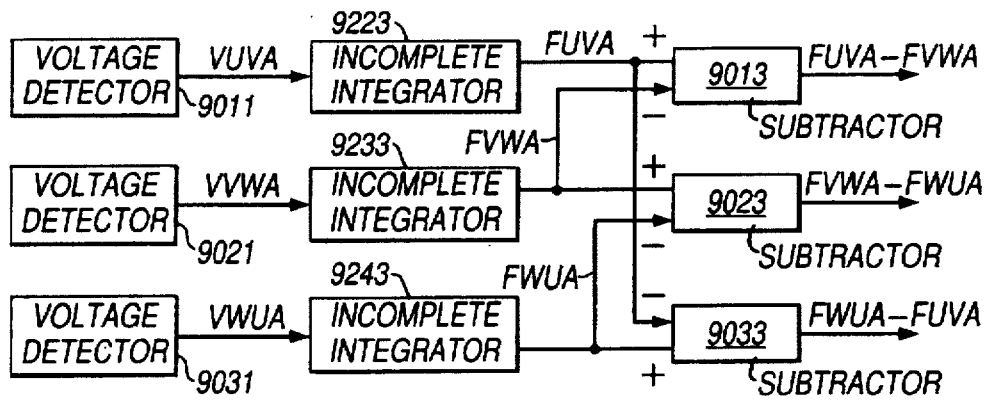
FIG. 18 is a block diagram showing a part of detailed construction of a magnetic flux detecting circuit 90F according to a sixth modification of this invention.
Figure 19:
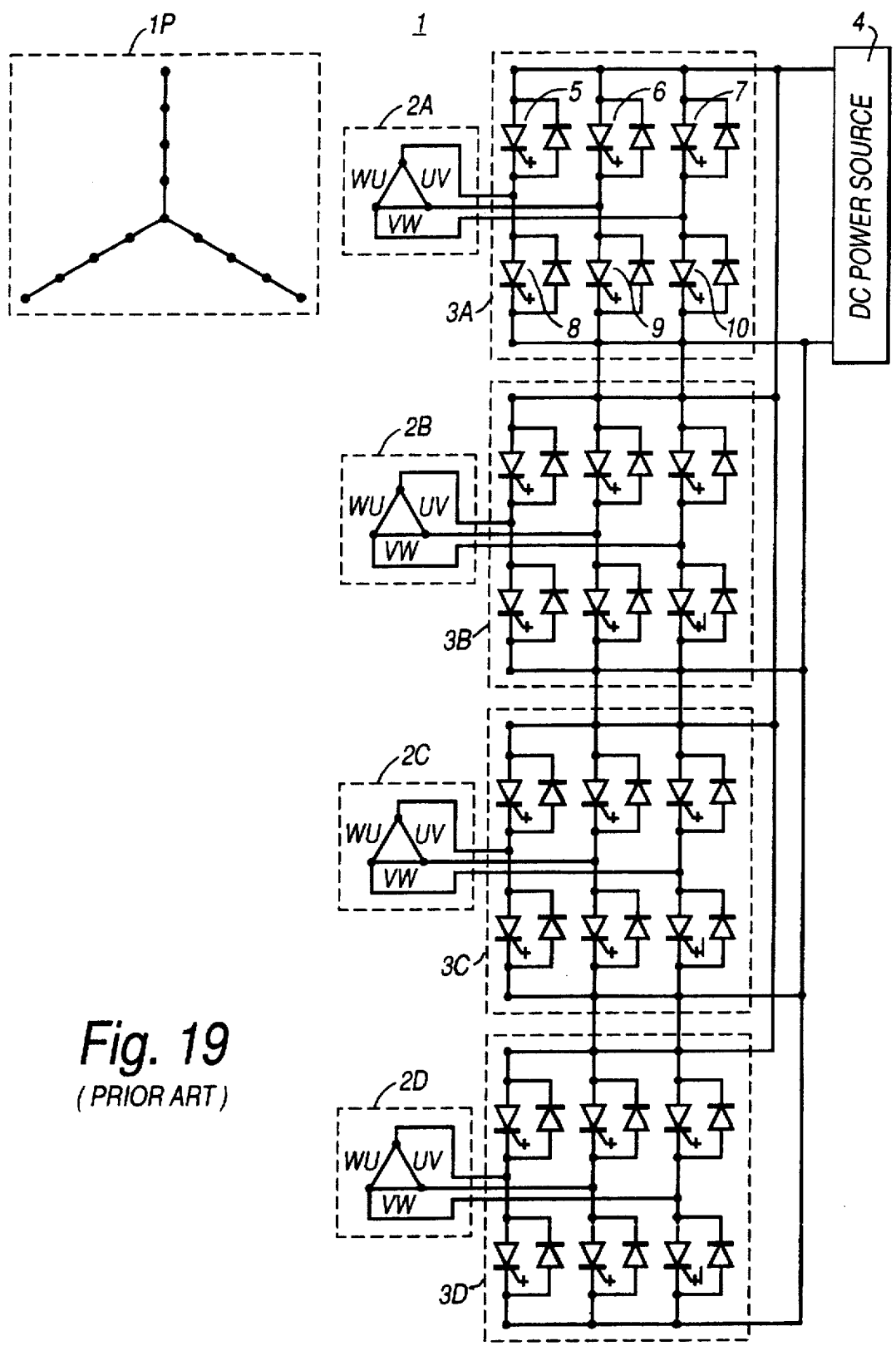
FIG. 19 is a block diagram showing a main circuit of a conventional power conversion system to which this invention is applied.
Figure 20:
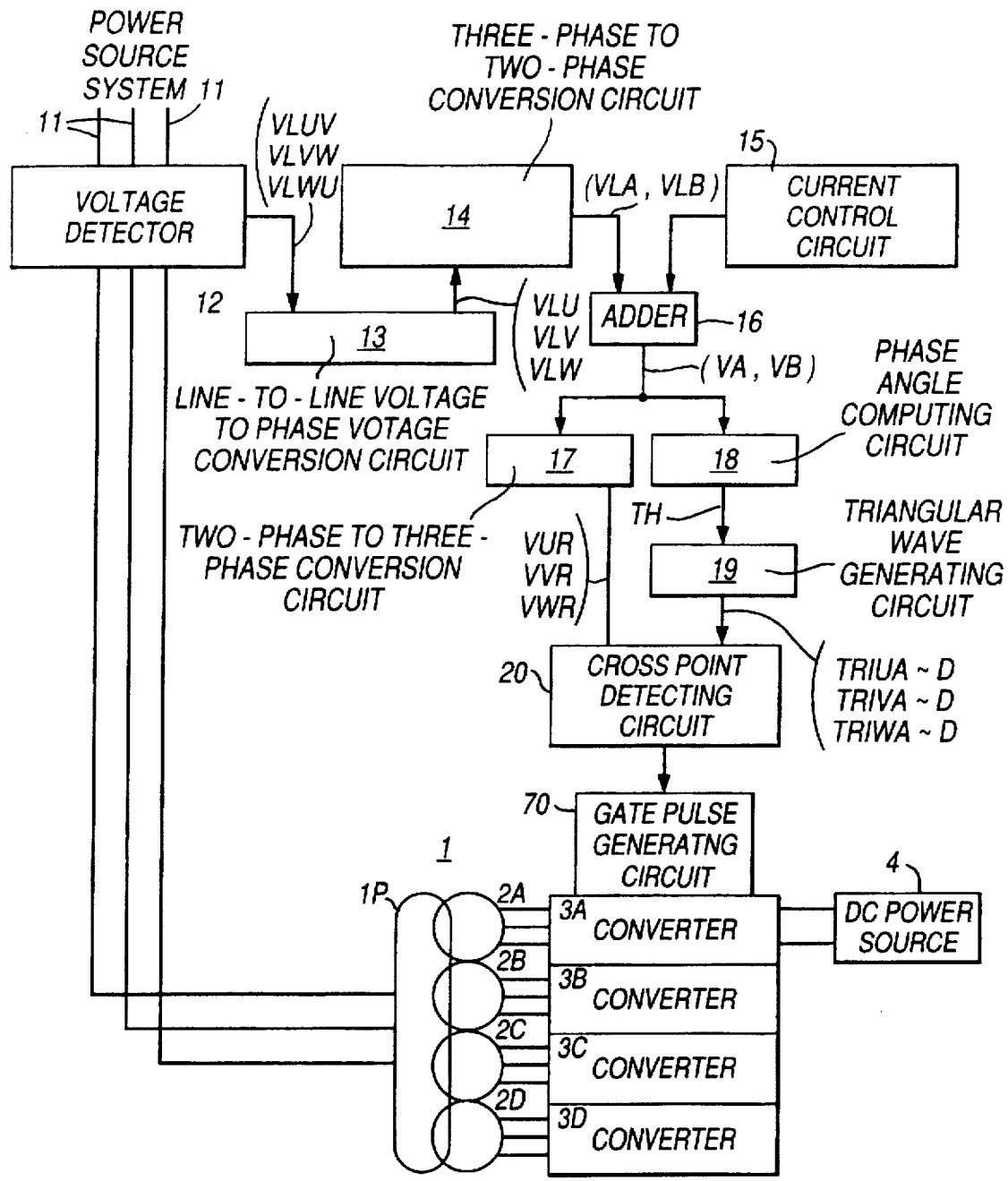
FIG. 20 is a block diagram showing a conventional control system for the power conversion system shown in FIG. 19.
Figure 21:
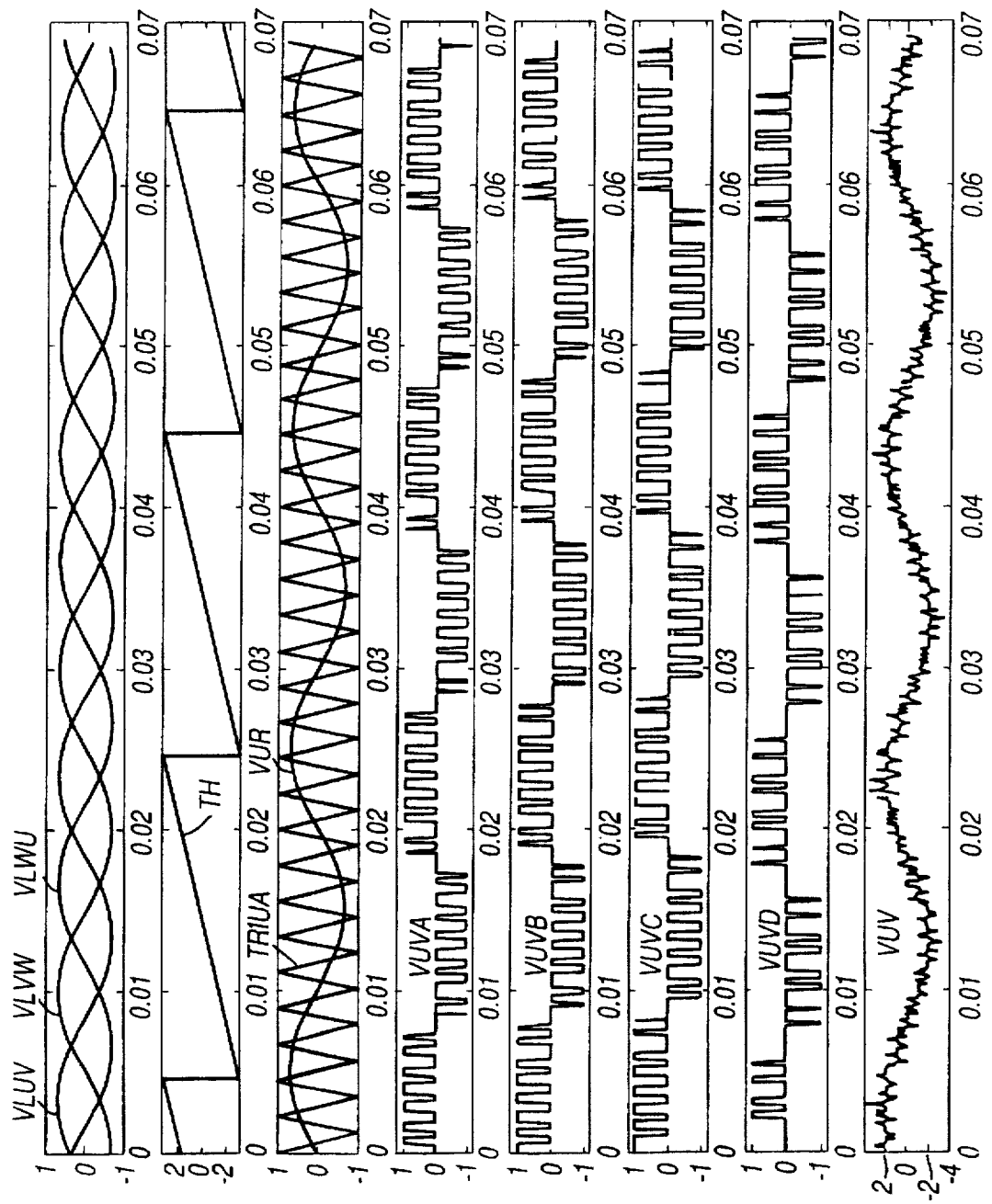
FIG. 21 is a waveforms diagram for explaining the operation of the conventional control system shown in FIG. 19.

FIG. 18 is a block diagram showing the construction of a magnetic flux detecting circuit 90F according to a sixth modification of this invention.

In FIG. 18, voltages applied to UV-phase, VW-phase and WU-phase of secondary windings 2A-2D of transformer 1 are detected by voltage detectors, respectively. By incompletely integrating detected voltages by incomplete integrators in which a time constant is brought in line with the vanishing characteristic of magnetic flux interlinking to secondary windings 2A-2D of transformer 1, and quantities equivalent to magnetic fluxes interlinking to secondary windings 2A-2D of transformer 1 are obtained, respectively.

In FIG. 18, magnetic flux detecting circuit 90F is composed by substituting integrators 9012, 9022 and 9032 in magnetic flux detecting circuit 90 shown in FIG. 10 by incomplete integrators 9223, 9233 and 9243, respectively.

In this figure, only the construction with respect to secondary winding 2A of transformer 1 is shown, but the construction with respect to secondary windings 2B-2D of transformer 1 should also be made in the same manner.

According to this modification, it is possible to obtain the same effect as the second embodiment. Further effect can be expected to avoid detected quantity equivalent to magnetic flux from being distorted by transient voltage when starting the power conversion system. Furthermore, according to this modification, as a time constant of the incomplete integration is brought in line with the vanishing characteristic of magnetic flux, it is possible to compute magnetic fluxes interlinking to secondary windings 2A-2D of transformer 1 more accurately, and improve the effect of the second embodiment.

In the second embodiment and the modifications thereof, the subtractors are used and the quantities such as FUVA-FVWA and so on, are generated as the quantities equivalent to magnetic fluxes of secondary windings 2A-2D of transformer 1 from any of the magnetic flux detecting circuits 90, 90A-90F. But, this invention is not limited to this embodiment. According to another embodiment, subtractors may be omitted from the magnetic flux detecting circuit. In this case, the comparison circuit in the balance control circuit receives the quantities, such as FUVA, as the quantities equivalent to magnetic fluxes of secondary windings 2A-2D of transformer 1, and decides the order in the magnitudes based on such quantities.

In the above embodiments, a case is explained wherein 4 units of converters are operated by connecting them in series via a transformer in the power conversion system. However this invention can be applied to the power conversion system wherein a plurality of converters more than 4 units are operated by connecting them in series via a transformer. Further, a case wherein converters are constructed by bridge connected GTOs is explained as one example. But, this invention can be applied to the case where self-turn-off switching devices other than GTOs are bridge connected, instead of GTOs in converters.

Further, in the above explanation, the output of current control circuit 15 is explained to be zero in order to make the explanation easy to understand. However, if current control circuit 15 is used, the ripple of the output of current control circuit 15 is superposed to the command voltage vector that is the standard for selection by voltage vector selecting circuit 40 and the PWM operation is added, and current waveform will become more close to sine wave. In this case, the number of switchings increases slightly as a result of this PWM operation, but when compared with the method described according to the conventional technique, the number of switchings becomes ¼ to ⅓ and the switching loss can still be reduced.

As explained above, according to this invention, in a power conversion system which operates with AC output voltages from a plurality of unit converters connected to the secondary windings of the transformer and the primary windings of the transformer connected in series, it is possible to control output voltage of the power conversion system to step-shaped waveform following a command value by detecting AC system voltage at the primary winding of the transformer, deciding voltage vectors which are to be output by unit converters from the command voltage vector representing the AC system voltage, and controlling ON/OFF of the self-turn-off switching devices of unit converters. Accordingly, it is possible to obtain sine wave shaped output voltage with less distortion and to follow a sudden change in system voltage without delay when a fault is taken place. Furthermore, as each self-turn-off switching device of the converter repeats ON/OFF by one time per period in the steady operating state, the number of switchings is less, the switching loss can be reduced, and the converter efficiency can be increased. In addition, as quantities equivalent to magnetic fluxes interlinking to the secondary windings of the transformer are so controlled that they are balanced, it is possible to control so as not to generate DC components in voltages applied to the secondary windings. Accordingly, even if system voltage is sharply distorted by the line-to-ground fault of the system, it is possible to continuously operate the converters without saturating the transformer.

Obviously, numerous modifications and variations of the present invention are possible in light of the above teachings. It is therefore to be understood that within the scope of the appended claims, the invention may be practiced otherwise than as specifically described herein.

What is claimed is:

1. A control system for a power conversion system composed of a plurality of unit converters and a transformer for connecting AC outputs of said unit converters in series, each of said unit converters composed of a plurality of bridge connected self-turn-off devices for converting DC power into AC power, each of AC sides of said unit converters connected to one of secondary windings of said transformer, respectively, DC sides of said unit converters connected in parallel to each other, respectively, and a primary winding of said transformer adapted for connecting to an AC power system, said control system comprising:

means for detecting an AC system voltage at said primary winding of said transformer;

means for generating a command voltage vector of a voltage output from said power conversion system at said primary winding of said transformer based on said AC system voltage;

means for generating a plurality of actual voltage vectors of voltages output from said power conversion system at said primary winding of said transformer;

means for selecting one of said actual voltage vectors that is the closest to said command voltage vector to generate as a selected actual voltage vector;

means for calculating a plurality of voltage vectors based on said selected actual voltage vector, each of said voltage vectors allocated to one of said unit converters, respectively, and output from one of said unit converters, respectively, and for generating a plurality of ON-OFF commands for said self-turn-off devices, each determined by one of said voltage vectors, respectively; and means for generating gate pulses to said self-turn-off devices of said unit converters based on said ON-OFF commands;

whereby to control said power conversion system so as to generate said selected actual voltage vector that is the closest to said command voltage vector at said primary winding of said transformer.

2. A control system for a power conversion system composed of a plurality of unit converters and a transformer for connecting AC outputs of said unit converters in series, each of said unit converters composed of a plurality of bridge connected self-turn-off devices for converting DC power into AC power, each of AC sides of said unit converters connected to one of secondary windings of said transformer, respectively, DC sides of said unit converters connected in parallel to each other, respectively, and a primary winding of said transformer adapted for connecting to an AC power system, said control system comprising:

means for detecting an AC system voltage at said primary winding of said transformer;

means for generating a command voltage vector of a voltage output from said power conversion system at said primary winding of said transformer based on said AC system voltage;

means for generating a plurality of actual voltage vectors of voltages output from said power conversion system at said primary winding of said transformer;

means for selecting one of said actual voltage vectors that is the closest to said command voltage vector to generate as a selected actual voltage vector;

means for detecting quantities equivalent to magnetic fluxes interlinking to said secondary windings of said transformer;

means for calculating a plurality of voltage vectors based on said selected actual voltage vector and said quantities equivalent to said magnetic fluxes, each of said voltage vectors allocated to one of said unit converters, respectively, and output from one of said unit converters, respectively, and for generating a plurality of ON-OFF commands for said self-turn-off devices, each determined by one of said voltage vectors, respectively; and means for generating gate pulses to said self-turn-off devices of said unit converters based on said ON-OFF commands;

whereby to control said power conversion system so as to generate said selected actual voltage vector that is the closest to said command voltage vector at said primary winding of said transformer.

3. The control system for a power conversion system according to claim 2, wherein said means for detecting quantities equivalent to magnetic fluxes includes:

a plurality of voltage detectors, each for detecting a voltage applied to one of said secondary windings of said transformer, respectively; and a plurality of integrators, each for integrating one of outputs of said voltage detectors to obtain one of said quantities equivalent to magnetic fluxes interlinking to said secondary windings of said transformer, respectively.

4. The control system for a power conversion system according to claim 2, wherein said means for detecting quantities equivalent to magnetic fluxes includes:

a plurality of magnetic sensors, each installed in one of magnetic paths of said secondary windings of said transformer to obtain one of said quantities equivalent to magnetic fluxes interlinking to said secondary windings of said transformer, respectively.

5. The control system for a power conversion system according to claim 2, wherein said means for detecting quantities equivalent to magnetic fluxes includes:

a DC voltage detector for detecting a DC voltage of said power conversion system;

a plurality of calculation means, each connected to receive an output of said DC voltage detector and one of said ON-OFF commands to said self-turn-off devices in said unit converters to obtain one of voltages applied to one of said secondary windings of said transformer, respectively; and a plurality of integrators, each for integrating one of outputs of said calculation means to obtain one of said quantities equivalent to magnetic fluxes interlinking to said secondary windings of said transformer, respectively.

6. The control system for a power conversion system according to claim 2, wherein said means for detecting quantities equivalent to magnetic fluxes includes:

a plurality of calculation means, each connected to receive a DC voltage command of said power conversion system and one of said ON-OFF commands to said self-turn-off devices in said unit converters to obtain one of voltages applied to one of said secondary windings of said transformer, respectively; and a plurality of integrators, each for integrating one of outputs of said calculation means to obtain one of said quantities equivalent to magnetic fluxes interlinking to said secondary windings of said transformer, respectively.

7. The control system for a power conversion system according to claim 2, wherein said means for detecting quantities equivalent to magnetic fluxes includes:

a DC voltage detector for detecting a DC voltage of said power conversion system;

a plurality of calculation means, each connected to receive an output of said DC voltage detector and one of said ON-OFF commands to said self-turn-off devices in said unit converters to obtain one of voltages applied to one of said secondary windings of said transformer, respectively; and a plurality of incomplete integrators, each for incompletely integrating one of outputs of said calculation means to obtain one of said quantities equivalent to magnetic fluxes interlinking to said secondary windings of said transformer, respectively.

8. The control system for a power conversion system according to claim 7, wherein:

in said plurality of incomplete integrators, a time constant of each of said incomplete integrators is in line with vanishing characteristic of one of said magnetic fluxes interlinking to said secondary windings of said transformer, respectively.

9. The control system for a power conversion system according to claim 2, wherein said means for detecting quantities equivalent to magnetic fluxes includes:

a plurality of calculation means, each connected to receive a DC voltage command of said power conversion system and one of said ON-OFF commands to said self-turn-off devices in said unit converters to obtain one of voltages applied to one of said secondary windings of said transformer, respectively; and a plurality of incomplete integrators, each for incompletely integrating one of outputs of said calculation means to obtain one of said quantities equivalent to magnetic fluxes interlinking to said secondary windings of said transformer, respectively.

10. The control system for a power conversion system according to claim 9, wherein:

in said plurality of incomplete integrators, a time constant of each of said incomplete integrators is in line with vanishing characteristic of one of said magnetic fluxes interlinking to said secondary windings of said transformer, respectively.

11. The control system for a power conversion system according to claim 2, wherein said means for detecting quantities equivalent to magnetic fluxes includes:

a plurality of voltage detectors, each for detecting a voltage applied to one of said secondary windings of said transformer, respectively; and a plurality of incomplete integrators, each for incompletely integrating one of outputs of said voltage detectors to obtain one of said quantities equivalent to magnetic fluxes interlinking to said secondary windings of said transformer, respectively.

12. The control system for a power conversion system according to claim 11, wherein:

in said plurality of incomplete integrators, a time constant of each of said incomplete integrators is in line with vanishing characteristic of one of said magnetic fluxes interlinking to said secondary windings of said transformer, respectively.

* * * * *